(12) United States Patent
Hsieh et al.

(10) Patent No.: US 11,549,854 B2
(45) Date of Patent: Jan. 10, 2023

(54) CONDUCTIVE POLYMER NANOCELLULOSE AEROGELS AND USE AS STRAIN SENSOR

(71) Applicant: THE REGENTS OF THE UNIVERSITY OF CALIFORNIA, Oakland, CA (US)

(72) Inventors: You-Lo Hsieh, Davis, CA (US); Jian Zhou, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 293 days.

(21) Appl. No.: 16/874,490

(22) Filed: May 14, 2020

(65) Prior Publication Data

US 2020/0363273 A1   Nov. 19, 2020

Related U.S. Application Data

(60) Provisional application No. 62/848,090, filed on May 15, 2019.

(51) Int. Cl.
*C08J 5/18* (2006.01)
*C08J 9/28* (2006.01)
(Continued)

(52) U.S. Cl.
CPC ............ *G01L 1/2287* (2013.01); *C08J 5/18* (2013.01); *C08J 9/28* (2013.01); *C08L 81/08* (2013.01); *C08J 2205/026* (2013.01)

(58) Field of Classification Search
CPC .... G01L 1/2287; C08J 5/18; C08J 9/28; C08J 2205/026; C08J 5/045; C08J 2201/048; C08J 2301/02; C08J 2325/18; C08J 2401/02; C08J 2465/00; C08J 9/0085; C08J 2365/00; C08J 2425/18; C08J 9/0061; C08L 81/08; C08L 1/02; C08G 2261/1424; C08G 2261/3223; C08G 2261/794; C08G 2261/94; C08G 61/126; C08B 15/00
See application file for complete search history.

(56) References Cited

U.S. PATENT DOCUMENTS 9,255,008 B2   2/2016   Howard et al.
11,248,107 B2  2/2022   Hsieh et al.
(Continued)

FOREIGN PATENT DOCUMENTS

CN   104264260 A   1/2015
WO   2017116598 A1  7/2017
WO   2020087075 A1  4/2020

OTHER PUBLICATIONS

Li et al., Direct Ink Write 3D Printed Cellulose Nanofiber Aerogel Structures with Highly Deformable, Shape Recoverable, and Functionalizable Properties, ACS Sustainable Chemistry & Engineering 2018 6 (2), p. 2011-2022 and accompanying supporting material S1-S17 (Year: 2018).*

(Continued)

*Primary Examiner* — Kara B Boyle
(74) *Attorney, Agent, or Firm* — Mintz, Levin, Cohn, Ferris, Glovsky and Popeo, P.C.

(57) ABSTRACT

The present disclosure provides an aerogel comprising conductive polymers and cellulose nanofibrils (CNF). The present disclosure also provides a sensor comprising the aerogels of the present invention.

9 Claims, 18 Drawing Sheets

(51) Int. Cl.
  C08L 81/08      (2006.01)
  G01L 1/22       (2006.01)

(56) References Cited

U.S. PATENT DOCUMENTS

| | | | |
|---|---|---|---|
| 2012/0216718 | A1 | 8/2012 | Berglund et al. |
| 2016/0010279 | A1 | 1/2016 | Hu et al. |
| 2018/0040806 | A1* | 2/2018 | Gong .................. C08J 5/24 |
| 2019/0309144 | A1 | 10/2019 | Hsieh et al. |
| 2020/0339783 | A1 | 10/2020 | Cunha et al. |
| 2021/0156051 | A1 | 5/2021 | Hsieh et al. |
| 2021/0381167 | A1 | 12/2021 | Hsieh et al. |

OTHER PUBLICATIONS

Khasim, Journal of electronic materials, vol. 46, No. 7, 2017, p. 4439-4447. (Year: 2017).*
Yang, Flexible highly specific capacitance aerogel electrodes based on cellulose nanofibers, carbon nanotubes and polyaniline, Electrochimica Acta 182 (2015) p. 264-271. (Year: 2015).*
International Search Report and Written Opinion received for PCT Application No. PCT/US2019/058376, dated Jan. 13, 2020, 9 pages.
Gao et al. (2010) "Epitaxial Graphene on Cu(111)", Nano Letters, 10(9):3512-3516.
Geim A.K. (Jun. 19, 2009) "Graphene: Status and Prospects", Science, 324(5934):1530-1534.
Isobe et al. (Jan. 8, 2018) "Clear Transparent Cellulose Nanopaper Prepared from a Concentrated Dispersion by High-Humidity Drying", RSC Advances, 8(8):1833-1837.
Jiang et al. (2014) "Amphiphilic Superabsorbent Cellulose Nanofibril Aerogels", Journal of Materials Chemistry A, 2(18):6337-6342.
Jiang et al. (2017) "Cellulose Nanofibril Aerogels: Synergistic Improvement of Hydrophobicity, Strength, and Thermal Stability via Cross-Linking with Diisocyanate", ACS Applied Materials & Interfaces, 9(3):2825-2834.
Jiang et al. (2013) "Chemically and Mechanically Isolated Nanocellulose and Their Self-assembled Structures", Carbohydrate Polymers, 95(1):32-40.
Jiang et al. (2013) "Controlled Defibrillation of Rice Straw Cellulose and Self-assembly of Cellulose Nanofibrils into Highly Crystalline Fibrous Materials†", RSC Advances, 3:12366-12375.
Jiang et al. (2018) "Dual Wet and Dry Resilient Cellulose II Fibrous Aerogel for Hydrocarbon-Water Separation and Energy Storage Applications", ACS Omega, 3(3):3530-3539.
Jiang et al. (2016) "Self-assembling of TEMPO Oxidized Cellulose Nanofibrils as Affected by Protonation of Surface Carboxyls and Drying Methods", ACS Sustainable Chemistry & Engineering, 4(3):1041-1049.

Kobayashi et al. (Sep. 22, 2014) "Aerogels with 3D Ordered Nanofiber Skeletons of Liquid-Crystalline Nanocellulose Derivatives as Tough and Transparent Insulators†", Angewandte Chemie-International Edition, 53(39):10394-10397.
Lotya et al. (Mar. 2009) "Liquid Phase Production of Graphene by Exfoliation of Graphite in Surfactant/Water Solutions", Journal of the American Chemical Society, 131(10):3611-3620.
Lu et al. (2012) "Preparation and Characterization of Cellulose Nanocrystals from Rice Straw", Carbohydrate Polymers, 87(1):564-573.
Pääkkö et al. (2008) "Long and Entangled Native Cellulose I Nanofibers Allow Flexible Aerogels and Hierarchically Porous Templates for Functionalities", Soft Matter, 4(12):2492-2499.
Paton et al. (2014) "Scalable Production of Large Quantities of Defect-free Few-layer Graphene by Shear Exfoliation in Liquids", Nature Materials, 13(6):624-630.
Sehaqui et al. (2010) "Mechanical Performance Tailoring of Tough Ultra-high Porosity Foams Prepared from Cellulose I Nanofiber Suspensions", Soft Matter, 6:1824-1832.
Wicklein et al. (2015) "Thermally Insulating and Fire-retardant Lightweight Anisotropic Foams Based on Nanocellulose and Graphene Oxide", Nature Nanotechnology, 10:277-283.
Xu et al. (2019) "Aqueous Exfoliated Graphene by Amphiphilic Nanocellulose and its Application in Moisture-responsive Foldable Actuators†", Nanoscale, 11:11719-11729.
Xu et al. (Mar. 22, 2013) "Cellulose Nanocrystals vs. Cellulose Nanofibrils: A Comparative Study on Their Microstructures and Effects as Polymer Reinforcing Agents", ACS Applied Materials & Interfaces, 5(8):2999-3009.
Xu et al. (May 12, 2014) "Comparison Between Cellulose Nanocrystal and Cellulose Nanofibril Reinforced Poly(ethylene oxide) Nanofibers and Their Novel Shish-Kebab-Like Crystalline Structures", Macromolecules, 47:3409-3416.
Zhang et al. (2014) "Ultralightweight and Flexible Silylated Nanocellulose Sponges for the Selective Removal of Oil from Water", Chemistry of Materials, 26:2659-2668.
Zhou et al. (Aug. 9, 2018) "Conductive Polymer Protonated Nanocellulose Aerogels for Tunable and Linearly Responsive Strain Sensors", ACS Applied Materials & Interfaces, 10:27902-27910.
Zhou et al. (Jun. 12, 2013) "Improving Electrical Conductivity in Polycarbonate Nanocomposites Using Highly Conductive PEDOT/PSS Coated MWCNTs", ACS Applied Materials & Interfaces, 5(13):6189-6200.
Zhou et al. (2020) "Nanocellulose Aerogel-based Porous Coaxial Fibers for Thermal Insulation", Nano Energy, 68(104305):9 pages.
Zhou et al. (Feb. 14, 2014) "Probing the Role of Poly(3,4-ethylenedioxythiophene)/Poly(styrenesulfonate)-Coated Multiwalled Carbon Nanotubes in the Thermal and Mechanical Properties of Polycarbonate Nanocomposites", Industrial & Engineering Chemistry Research, 53(9):3539-3549.

* cited by examiner

| Aerogel | Average diameter (mm) | Tensile strength (KPa) | Yung's Modulus (ohm) | Elongation at break (%) |
|---|---|---|---|---|
| CNF | 3.8 ± 0.2 | 36.2 ± 5.3 | 510.4 ± 95.3 | 4.0±0.4 |
| PEDOT/PSS | 3.8 ± 0.2 | 2.4 ± 0.7 | 32.8 ± 5.3 | 4.6±0.4 |
| PEDOT/PSS /CNF | 3.0 ± 0.3 | 25.0 ± 4.1 | 282.3 ± 78.5 | 2.9±0.4 |

CONDUCTIVE POLYMER NANOCELLULOSE AEROGELS AND USE AS STRAIN SENSOR

CROSS-REFERENCES TO RELATED APPLICATIONS

This application claims priority to U.S. Provisional Application No. 62/848,090, filed May 15, 2019, which is incorporated herein in its entirety for all purposes.

BACKGROUND OF THE INVENTION

Very strong and highly conductive aerogels have been assembled from cellulose nanofibrils (CNFs) protonated with conductive poly (3,4-ethylene dioxythiophene)/poly (styrene sulfonate) (PEDOT/PSS) complex at equal mass or less. Protonating CNF surface carboxylates and hydrogen bonding CNF surface carboxyls with PSS in PEDOT/PSS generated PEDOT/PSS/CNF aerogels that were up to ten times stronger while as conductive as neat PEDOT/PSS aerogel, attributed to the transformation of PEDOT benzoid structure to the more electron transfer-preferred quinoid structure. Ethylene glycol (EG) vapor annealing further increased the conductivity of PEDOT/PSS/CNF aerogels by two orders of magnitude. The poly-dimethylsiloxane (PDMS)-infused conductive PEDOT/PSS/CNF aerogel (70 wt % CNF) transform a resistance-insensitive PDMS-infused PEDOT/PSS aerogel (gauge factor of $1.1 \times 10^{-4}$) into a stretchable, highly sensitive and linearly responsive strain sensor (gauge factor of 14.8 at 95% strain).

Strain sensors have continued to grab extensive interests because of their potential applications in a variety of areas including artificial e-skins and health monitoring/diagnosis. Among the major performance criteria for strain sensors, i.e., sensitivity, stretchability, linearity over strain and stability over time, the relative change in resistance over applied strain, or sensitivity, at the microstrain (less than 1%) levels is particularly vital. Common metallic foil mechanical gauges are limited by not only their ability to detect small deformations (<5%) but also their easy deformation from use. Next-generation mechanical sensors that are highly sensitive, responsive to wider range of mechanical deformation, and yet highly resilient for repetitive use are therefore desirable.

Highly porous and flexible cellulose aerogels that contain conductive nanomaterials like carbon nanotubes (CNTs), graphene, and conductive polymer nanoparticles have shown to possess dual compressive flexibilities and electric conductivities to emerge as promising choices for piezoresistive sensors. Dual temperature and pressure sensing aerogels were fabricated by mixing nanofibrillated cellulose (NFC) produced by high pressure homogenization with polysilane and poly(3,4-ethylene dioxythiophene)/poly(styrene sulfonate) (PEDOT/PSS), but the interplay between NFC and PEDOT/PSS was not elucidated. Unidirectional freeze-drying TEMPO-CNF derived by 2,2,6,6-tetramethylpiperidine-1-oxyl (TEMPO)-mediated oxidation mixed with reduced graphene oxide (RGO) produced aerogels capable of detecting gas pressure drop perpendicular to the freezing direction. Conductive aerogels produced from CNT dispersed in cellulose dissolved in aqueous alkaline-urea followed by freeze and freeze-drying exhibited relative resistance change with imposed nitrogen gas pressure. While compression and pressure sensing have been demonstrated, conductive aerogels as stretchable strain sensors have yet to be explored. The challenge lies in the non-conductive nature and low dry compressive strength of nanocellulose aerogel that must be overcome by a strong interplay between the conductive species and the nanocellulose.

To enhance CNF self-assembly by protonation with large cationic polymers has not been exploited, yet has the potential to improve the mechanical strength of self-assembled CNF structures, such as aerogels. The hygroscopic, acidic and conductivity-tunable nature of (PEDOT/PSS) makes it a good candidate for protonating CNF while also providing high conductivity. Moreover, the carbonyl and hydroxyl double dipoles of the abundant CNF surface carboxyls are capable of hydrogen bonding with the PSS $SO_3H$ groups. The protonating capability of and strong interaction between conducting PEDOT/PSS and strong CNFs are thought to lead to strong aerogels with highly conductive networks that may meet the requirements for strain sensors.

Herein is described an approach to synthesize conductive and robust nanocellulose aerogels by protonating TEMPO-CNF with conductive PEDOT/PSS and further infuse these aerogels with an elastomer to produce stretchable high-performance strain sensors. Conducting PEDOT/PSS/CNF aerogels were fabricated by incorporating varying levels of TEMPO-CNF followed by lyophilization and ethylene glycol vapor annealing. The protonation of TEMPO-CNF with PEDOT/PSS and the effects of CNF loading on the conductivity and strength of PEDOT/PSS/CNF aerogels were investigated. These PEDOT/PSS/CNF aerogels were further infused with an elastomer precursor and cured to produce stretchable strain sensors. The microstructure, electrical and mechanical performance of these elastomer-infused PEDOT/PSS/CNF aerogel were then characterized to relate to their sensing mechanism.

BRIEF SUMMARY OF THE INVENTION

In one embodiment, the present invention provides an aerogel composition comprising: a conductive polymer; and cellulose nanofibrils (CNF).

In another embodiment, the present invention provides a sensor comprising: a first polymer substrate having a first surface; a conducting layer comprising an aerogel composition of the present invention, wherein the conducting layer is deposited on the first surface of the first polymer substrate and having a first end and a second end; a first electrode at the first end of the conductive layer; a second electrode at the second end of the conductive layer; and a second polymer substrate deposited on the conducting layer.

BRIEF DESCRIPTION OF THE DRAWINGS

FIG. 1A shows protonation of CNF surface carboxylats and their hydrogen bonding with PSS in PEDOT/PSS; FIG. 1B shows schematic of protonation, freezing/lyophilization and EG vapor annealing processes; FIG. 1C shows photographs of CNF and PEDOT/PSS/CNF aerogels on top of California poppy and cylindrical PEDOT/PSS/CNF aerogels in different diameters.

FIG. 2A-B shows SEM images of PEDOT/PSS; FIG. 2C-D shows SEM images of PEDOT/PSS/CNF aerogels, with the arrows in FIG. 2D showing traces of CNF bundles embedded in PEDOT/PSS on pore wall surfaces; FIG. 2E-F show AFM height images of pristine PEDOT/PSS; and FIG. 2G-H shows AFM height images of PEDOT/PSS/CNF50 films; The images in FIGS. 2E and 2G are 20 µm×20 µm and in FIGS. 2F & 2H are 5 µm×5 µm.

FIG. 3A shows CNF loading and EG vapor annealing on conductivity; FIG. 3B shows CNF loading on conductivity of cast films of comparable compositions to aerogels; FIG. 3C shows FTIR spectra of CNF, PEDOT/PSS, and PEDOT/PSS/CNF aerogels; FIG. 3D shows saschematic of benziod and quinoid structure of PEDOT chains. FIG. 3E shows XRD patterns of CNF, PEDOT/PSS, and PEDOT/PSS/CNF50 aerogels; FIG. 3F shows Raman spectra of pristine PEDOT/PSS, PEDOT/PSS/CNF50 and EG vapor-annealed aerogels at an excitation wavelength of 514.5 nm, showing benzoid to quinoid structural transformation of PEDOT chain (as shown in FIG. 3D) from mixing with CNF and EG vapor annealing.

FIG. 4A shows PEDOT/PSS; FIG. 4B shows PEDOT/PSS/CNF50.

FIG. 5A shows $\Delta R/R_0$ under incremental increasing strains of cyclic loading and unloading; FIG. 5B shows strain effects of PDMS-infused PEDOT/PSS/CNF70 and PEDOT/PSS aerogels and the blue line represents the fitting line for the applied strain from 0% to 95% (with the linearity of 0.98); FIG. 5C shows dynamic response to five repetitive loading and unloading cycles at 50% strain; FIG. 5D shows effects of CNF loadings.

FIGS. 6A & 6B show PDMS infused PEDOT/PSS aerogel at 0% and 50% strains, respectively; FIGS. 6C & 6D show PDMS infused PEDOT/PSS/CNF70 aerogel at 0% and 50% strains, respectively; FIG. 6E shows schematic illustrations of the proposed microstructural change of the aerogel network under an applied tensile strain.

FIG. 7A shows stress-strain curves; FIG. 7B shows strength, modulus and elongation values.

FIG. 8A shows 0.7 wt % aqueous dispersions; FIG. 8B shows aerogels immersed in water for 30 min (note: PEDOT/PSS completely disintegrated in water).

FIG. 9A shows preparation of aerogel-based strain sensors; FIG. 9B shows electromechanical characterization of the strain sensors.

DETAILED DESCRIPTION OF THE INVENTION

I. General

Figure 1A:
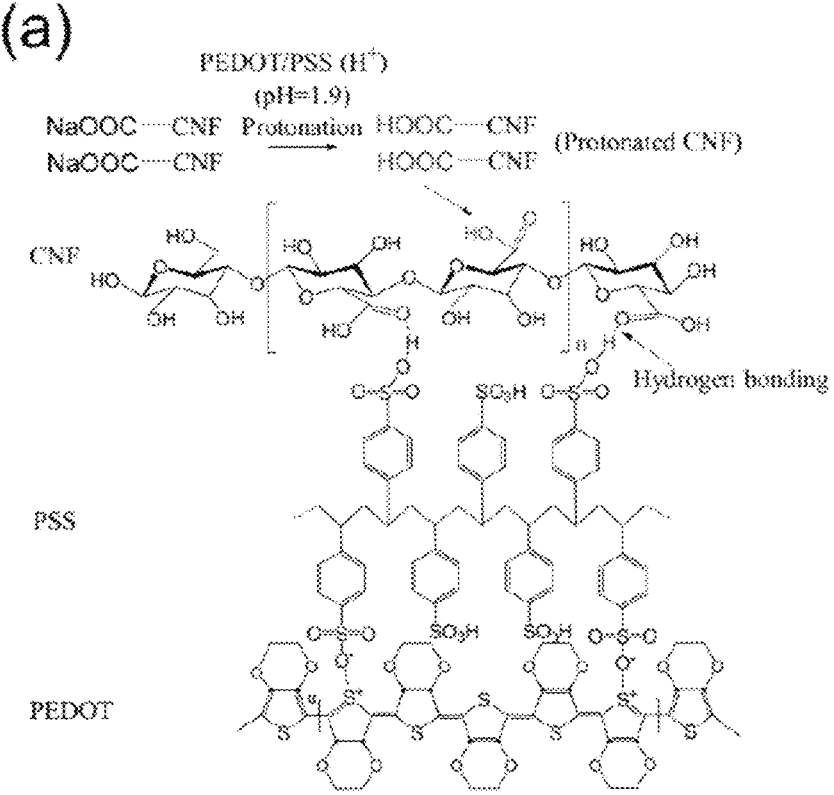
FIG. 1A-C shows conductive PEDOT/PSS/CNF aerogels.

The present invention provides aerogels made from cellulose nanofibrils (CNF) and conductive polymers, and methods of making the aerogel. The present invention also provides a sensor comprising the aerogels of the present invention.

II. Definitions

Unless specifically indicated otherwise, all technical and scientific terms used herein have the same meaning as commonly understood by those of ordinary skill in the art to which this invention belongs. In addition, any method or material similar or equivalent to a method or material described herein can be used in the practice of the present invention. For purposes of the present invention, the following terms are defined.

"A," "an," or "the" as used herein not only include aspects with one member, but also include aspects with more than one member. For instance, the singular forms "a," "an," and "the" include plural referents unless the context clearly dictates otherwise. Thus, for example, reference to "a cell" includes a plurality of such cells and reference to "the agent" includes reference to one or more agents known to those skilled in the art, and so forth.

"Aerogel" refers to a porous solid material with high porosity and low density. The pores of the aerogel allow for passage of gas or liquid phase molecules through the material. Representative aerogels include inorganic aerogels (such as silicon-derived aerogels), organic aerogels (such as carbon-derived aerogels), and inorganic/organic hybrid aerogels. Organic aerogels include, but are not limited to cellulose aerogels, urethane aerogels, resorcinol formaldehyde aerogels, polyolefin aerogels, melamine-formaldehyde aerogels, phenol-furfural aerogels and polyimide aerogels.

"Conductive polymer" refers to a polymer which can conduct electricity. The electrical conductivity can be tuned depending on the type of polymer(s) used. Conductive polymers can be acidic conductive polymers or basic conductive polymers. Examples of acid conductive polymers include PEDOT and PSS polymers.

"Acidic" or "acid" refers to a compound that is capable of donating a proton ($H^+$) under the Bronsted-Lowry definition, or is an electron pair acceptor under the Lewis definition. Acids useful in the present invention are Bronsted-Lowry acids that include, but are not limited to, carboxylic acids and sulfonic acids. Sulfonic acids include methanesulfonic acid, benzenesulfonic acid, p-toluenesulfonic acid, trifluoromethanesulfonic acid, among others.

"Cellulose nanofibrils" (CNF) refers to a type of nanocellulose wherein the nanofibrils are formed from cellulose. The cellulose may be chemically modified or unmodified. Nanocellulose refers to a relatively crystalline cellulose in either rod-like or fibril-like forms with nanometer scale lateral dimensions and hundreds to thousands of nm in lengths.

"Poly(3,4-ethylene dioxythiophene)" (PEDOT) refers to a polymer with the following structure:

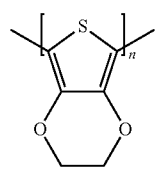

wherein n is an integer.

"Poly(styrene sulfonate)" (PSS) refers to a polymer with the following structures:

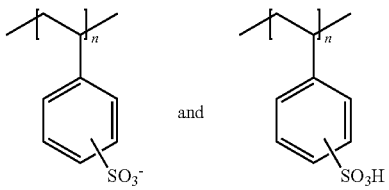

wherein n is an integer.

"Sensor" refers to a component which can detect variables such as electrical resistance and electrical sensitivity over time. Sensors can also detect stretchability and linearity of tensile strain and thermal stability over time.

"Polymer substrate" refers to a polymer which can be cured to form a harder polymer material. The polymer substrate can be cured by UV light or by heat. Polymer substrates useful in the present invention include, but are not limited to homopolymers, copolymers, and elastomers. Elastomers useful in the present invention include, but are not limited to polydimethylsiloxane (PDMS).

"Conducting layer" refers to a material which can conduct electric current.

"Electrode" refers to a material which conducts flow of electric current to or from a circuit or power source.

"Tensile strength" refers to how much stress a material can withstand before breaking. The material is tested by being stretched or pulled. The units for tensile strength can be in pressure, such as kPa, or any unit conversion equivalent.

"Young's modulus" refers to the stiffness of a solid material, and in some embodiments may be referred to as modulus of elasticity. The units for Young's modulus can be in pressure, such as kPa, or any unit conversion equivalent.

III. Aerogel Compositions

In some embodiments, the present invention provides an aerogel composition comprising: a conductive polymer; and cellulose nanofibrils (CNF).

The conductive polymers useful in the present invention can be any conductive polymer known by one of skill in the art. The conductive polymers can be neutral or comprise ionic functional groups. The conductive polymers comprising ionic functional groups can be acidic or basic conductive polymers. In some embodiments, the conductive polymer comprises polyacetylene, poly(p-phenylene vinylene) (PVV), polyfluorene, polyphenylene, polypyrene, polyazulene, polynaphthalene, polypyrrole, polyindole, polyaniline (PANT), polycarbazole, polyazepine, polythiophene, poly (3,4-ethylene dioxythiophene) (PEDOT), poly(styrene sulfonate) (PSS), or a combination thereof.

The electrical conductivity of the aerogel can be measured by compressing the aerogel into thick sheets on a glass slide to form a casted film, wherein the electrical conductivity ($\sigma$) of the film is calculated as $\sigma=1/(tR_s)$. Film thickness, t, can be measured using a profilometer, such as a Dektak XT profilometer. Sheet resistance, $R_s$, can be measured by the four-probe method known by one of skill in the art under a constant current, with the voltage measured with a multimeter. $R_s$ may be measured at different locations on the film, with the average value used.

The ionic conductivity of the aerogel composition can be measured using an OAKTON pH/CON 510 series meter with an ionic conductivity probe. The pH values of the aerogel composition can also be measured using an OAKTON pH/CON 510 series meter with a pH probe.

The mechanical behavior of the aerogel, conductive polymers, and CNF can be determined by measuring its tensile strength and Young's modulus using a 5566 Instron universal testing machine. In some embodiments, the tensile strength of the aerogel is from 15 to 35 kPa. In some embodiments, the tensile strength of the aerogel is from 20 to 30 kPa. In some embodiments, the tensile strength of the aerogel is from 20.9 to 29.1 kPa. In some embodiments, the Young's modulus of the aerogel is from 150 to 400 kPa, In some embodiments, the Young's modulus of the aerogel is from 180 to 400 kPa. In some embodiments, the Young's modulus of the aerogel is from 200 to 265 kPa. In some embodiments, the Young's modulus of the aerogel is from 203.8 to 360.8 kPa.

In some embodiments, the tensile strength of the conductive polymer is from 1 to 10 kPa. In some embodiments, the tensile strength of the conductive polymer is from 1 to 4 kPa. In some embodiments, the tensile strength of the conductive polymer is from 1.7 to 3.1 kPa. In some embodiments, the Young's modulus of the conductive polymer is from 20 to 50 kPa. In some embodiments, the Young's modulus of the conductive polymer is from 25 to 40 kPa. In some embodiments, the Young's modulus of the conductive polymer is from 27.5 to 38.1 kPa.

In some embodiments, the tensile strength of the CNF is from 25 to 45 kPa. In some embodiments, the tensile strength of the CNF is from 30 to 42 kPa. In some embodiments, the tensile strength of the CNF is from 30.9 to 41.5 kPa. In some embodiments, the Young's modulus of the CNF is from 350 to 700 kPa. In some embodiments, the Young's modulus of the CNF is from 400 to 650 kPa. In some embodiments, the Young's modulus of the CNF is from 415.1 to 605.7 kPa.

The conductive polymers can be dispersed in an aqueous solution at about 0.2%, 0.3%, 0.4%, 0.5%, 0.6%, 0.7%, 0.8%, 0.9%, 1%, 1.3%, 1.5%, 2%, 3%, 4% or 5% weight (wt) concentration. In some embodiments, the conductive polymer can be dispersed in an aqueous solution at about 0.5%, 0.6%, 0.7%, 0.8%, 0.9%, 1%, or 1.3% wt concentration. In some embodiments, the conductive polymer can be dispersed in an aqueous solution at about 0.7% wt concentration.

In some embodiments, the conductive polymer comprises a mixture of polymers. In some embodiments, the conductive polymer comprises a mixture of polyacetylene, polyaniline, polypyrrole, and polyindole. In some embodiments, the conductive polymer comprises a mixture of poly(3,4-ethylene dioxythiophene) (PEDOT) and poly(styrene sulfonate) (PSS).

In some embodiments, the conductive polymer is an acidic conductive polymer. In some embodiments, the acidic conductive polymer comprises a mixture of poly(3,4-ethylene dioxythiophene) (PEDOT) and poly(styrene sulfonate) (PSS).

In some embodiments, the PEDOT and PSS mixture comprises a ratio of PEDOT to PSS of from 50:1 to 1:50 (w/w). In some embodiments, the PEDOT and PSS mixture comprises a ratio of PEDOT to PSS of from 25:1 to 1:25 (w/w). In some embodiments, the PEDOT and PSS mixture comprises a ratio of PEDOT to PSS of from 10:1 to 1:10 (w/w). In some embodiments, the PEDOT and PSS mixture comprises a ratio of PEDOT to PSS of from 1:1 to 1:10

(w/w). In some embodiments, the PEDOT and PSS mixture comprises a ratio of PEDOT to PSS of about 1:1, 1:1.5, 1:2, 1:2.5, 1:3, 1:3.5, 1:4, 1:4.5, 1:5, 1:6, 1:7, 1:8, 1:9, or 1:10 (w/w). In some embodiments, the PEDOT and PSS mixture comprises a ratio of PEDOT to PSS of about 1:2.5 (w/w).

In some embodiments, the CNF is present in the composition from 5% to 95% (w/w). In some embodiments, the CNF is present in the composition from 10% to 90% (w/w). In some embodiments, the CNF is present in the composition from 20% to 80% (w/w). In some embodiments, the CNF is present in the composition from 25% to 75% (w/w). In some embodiments, the CNF is present in the composition from 25% to 70% (w/w). In some embodiments, the CNF is present in the composition at about 25%, 35%, 50%, 60%, 70%, or 80% (w/w). In some embodiments, the CNF is present in the composition at about 25%, 50%, 60%, or 70% (w/w). In some embodiments, the CNF is present in the composition at about 70% (w/w).

In some embodiments, the conductive polymer comprises a mixture of poly(3,4-ethylene dioxythiophene) (PEDOT) and poly(styrene sulfonate) (PSS) in a ratio of about 1:2.5 (w/w), and the CNF is present in the composition at about 70% (w/w).

IV. Sensors

In some embodiments, the present invention provides a sensor comprising: a first polymer substrate having a first surface; a conducting layer comprising an aerogel composition of the present invention, wherein the conducting layer is deposited on the first surface of the first polymer substrate and having a first end and a second end; a first electrode at the first end of the conductive layer; a second electrode at the second end of the conductive layer; and a second polymer substrate deposited on the conducting layer.

Figure 11:
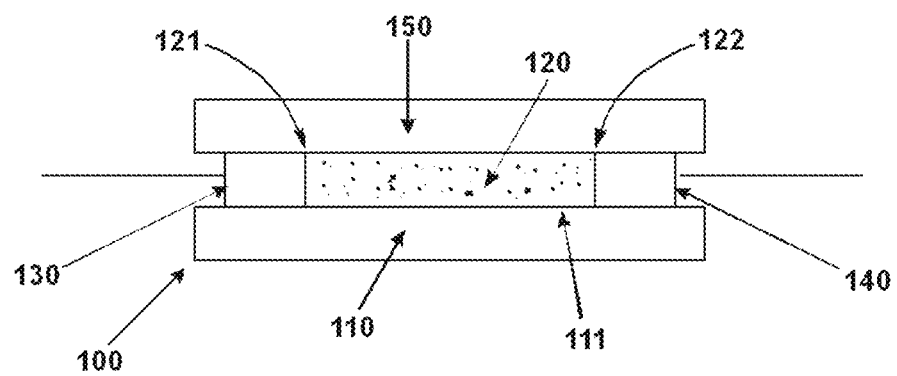
FIG. 11 shows a sensor drawing.

FIG. 11 illustrates a sensor 100 of the present invention. The first polymer substrate 110 has a first surface 111. The conducting layer 120 includes a first end 121 and a second end 122, and is deposited on the first surface 111 of the first polymer substrate 110. The first electrode 130 is connected at the first end of the conductive layer 121. The second electrode 140 is connected at the second end of the conductive layer 122. The second polymer substrate 150 is deposited on the conducting layer 120.

Figure 9A:
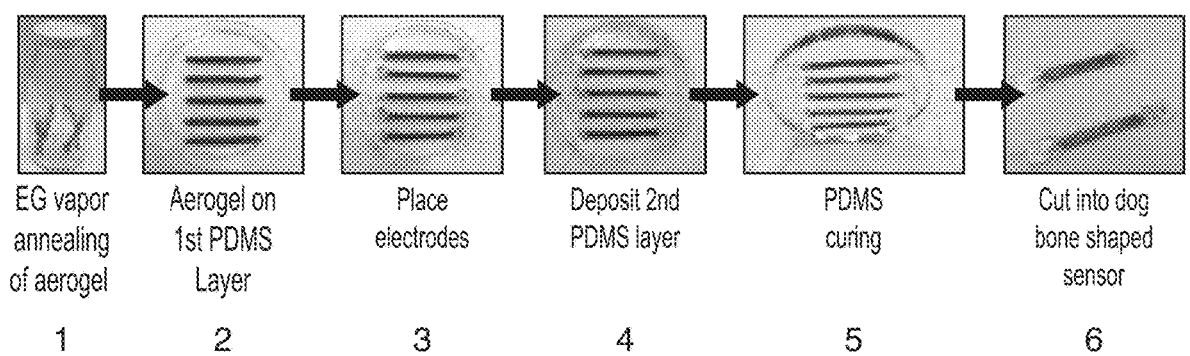
FIG. 9A-B shows PEDOT/PSS/CNF aerogel sensors.

FIG. 9A shows the steps of assembling a sensor, wherein the conducting layer comprising an aerogel composition is deposited on the first surface of the first polymer substrate as shown in the $2^{nd}$ step. The conducting layer has a first and second end, wherein a first electrode is attached to the first end and the second electrode is attached to the second end as shown in the $3^{rd}$ step. The second polymer substrate is then deposited on the conducting layer as illustrated in the $4^{th}$ step. The polymer substrate is then cured as illustrated in the $5^{th}$ step.

Polymer substrates useful in the present invention include any polymer substrates known by one of skill in the art. The polymer substrate can be homopolymers, copolymers, and elastomers. In some embodiments, the polymer substrate is an elastomer. In some embodiments, the polymer substrate is silicone rubber, polysiloxane, polydimethylsiloxane (PDMS), polyisoprene, polybutadiene, isobutylene, styrene-butadiene, acrylonitrile, ethylene propylene rubber, fluoroelastomers, ethylene-vinyl acetate, polysulfides, or combinations thereof. In some embodiments the polymer substrate is polydimethylsiloxane (PDMS).

The amount of polymer substrates useful in the present invention can be any suitable amount known by one of skill in the art. In some embodiments, the amount of the polymer substrate is about 2, 4, 4.3, 4.5, 4.7, 5, 7, 10, 13, 15, 17, 20, 23, or 25 grams. In some embodiments, the amount of the polymer substrate is about 4, 4.3, 5, 20 or 23 grams. In some embodiments, the amount of the polymer substrate is about 4.3 or 20 grams.

The polymer substrates useful in the present invention can be cured by any method known by one of skill in the art. In some embodiments, the polymer substrate is cured by UV light or by heat. In some embodiments, the polymer substrate is cured by heat. In some embodiments, the polymer substrate is cured at a temperature from 20° C. to 100° C. In some embodiments, the polymer substrate is cured at a temperature from 20° C. to 80° C. In some embodiments, the polymer substrate is cured at a temperature from 50° C. to 80° C. In some embodiments, the polymer substrate is cured at a temperature from 60° C. to 80° C. In some embodiments, the polymer substrate is cured at a temperature of about 70° C.

In some embodiments, the first polymer substrate and second polymer substrate is polydimethylsiloxane (PDMS).

V. Examples

Example 1: Preparing Conductive Nanocellulose Aerogels

Materials.

Aqueous poly (3,4-ethylene dioxythiophene)/poly (styrene sulfonate) (1:2.5 PEDOT/PSS w/w ratio) dispersion (Clevios PH1000) was purchased from HC Starck, Inc. Polydimethylsiloxane (PDMS, SYLGARD 184) was purchased from Sigma-Aldrich. Ethylene glycol (EG, purity>99.8 wt %) was purchased from Fisher Scientific. Cellulose nanofibrils (CNFs) were isolated from pure rice straw cellulose via TEMPO-mediated oxidation followed by mechanical blending. Briefly, 1.0 g of rice straw cellulose was oxidized in an aqueous solution containing 0.016 g of TEMPO, 0.1 g of NaBr and 5 mmol NaClO at pH 10.0. After centrifugation and dialysis, TEMPO-oxidized cellulose was blended (Vitamix 5200, Vita-Mix Corporation) at 37,000 rpm for 30 min, centrifuged (5,000 rpm, 15 min) to collect the supernatant. Then the supernatant was concentrated using a rotary evaporator (Buchi Rotavapor R-114) to 0.7 wt % and stored at 4° C. for preparation of films and aerogels.

Preparation of the PEDOT/PSS-CNF Films.

To investigate the effect of CNF loading to the conductivity of PEDOT/PSS, CNFs were added at seven levels based on dry weight: 0, 5, 10, 25, 50, 60, and 70 w %. Aqueous PEDOT/PSS/CNF solution (200 µL, 0.7 wt %) was cast on glass slides (2.5×2.5 cm$^2$) pretreated with oxygen plasma via a Micro-RIE Series 800 (Technics company) for 1 min to remove dust and to improve wettability for more uniform films. All PEDOT/PSS/CNF films were dried at 21° C. for 48 hours.

Preparation of the Aerogel.

Figure 1B:
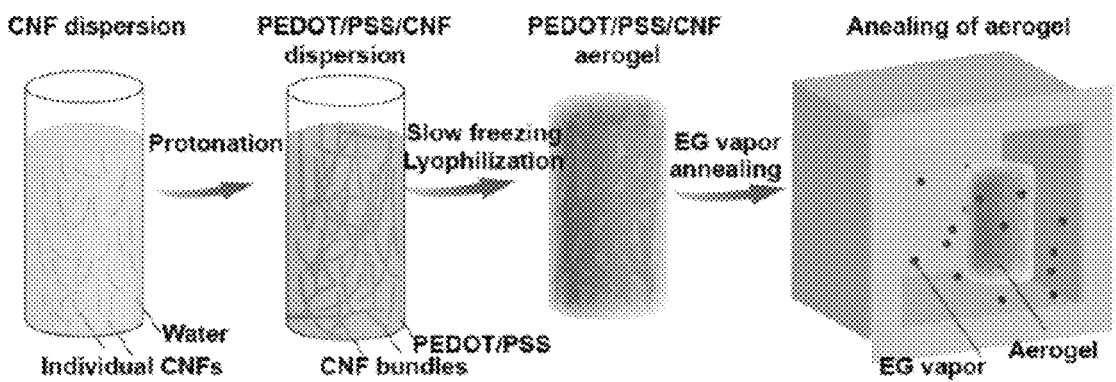
Figure 1C:
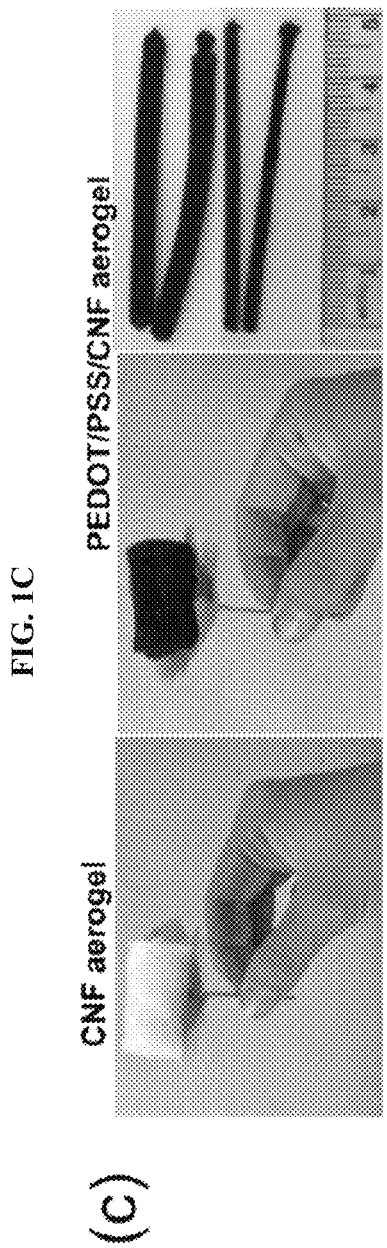

Equal mass (5.5. g) of aq. PEDOT/PSS was added to aq. CNF, both at 0.7 wt % concentration, and vigorously stirring for 30 min to a homogeneous mixture. Aerogels were prepared as previously reported (Jiang, F.; Hsieh, Y. L. Amphiphilic Superabsorbent Cellulose Nanofibril Aerogels J. Mater. Chem. A. 2014, 2, 6337-6342). The mixture of PEDOT/SS and CNF (solid weight ratio 1:1) was loaded into polypropylene tubes with 2.6 cm, and glass tubes with 4 mm and 2.5 mm inner diameters and frozen (−20° C., 15 h), then lyophilized (−50° C., 4 d, Free Zone 1.0 L Benchtop Freeze Dry System, Labconco, Kansas City, Mo.) to yield PEDOT/PSS/CNF aerogels. For comparison, CNF and PEDOT/PSS aerogels were also prepared the same way, each with 0.7 wt % aqueous dispersions. All aerogels were dried at 70° C. for 2 hours to remove residual moisture. By using different containers, aerogels with different diameters (20.0±2 mm, 3.0±0.3 mm, 2.1±0.2 mm) were obtained (FIG. 1C). To improve conductivities, PEDOT/PSS and PEDOT/PSS/CNF aerogels were placed in a closed glass jar containing 500∝1 EG heated at 150° C. under vacuum for 30 min. After EG vapor annealing, these aerogels were placed at 150° C. for 30 min to remove the EG residue. The PEDOT/PSS/CNF aerogels with CNF loading at 25%, 50%, 60% and 70% were prepared and designated as PEDOT/PSS/CNF25, PEDOT/PSS/CNF50, PEDOT/PSS/CNF60, and PEDOT/PSS/CNF70, respectively.

Example 2: Properties of Conductive Aerogels

Figure 10:
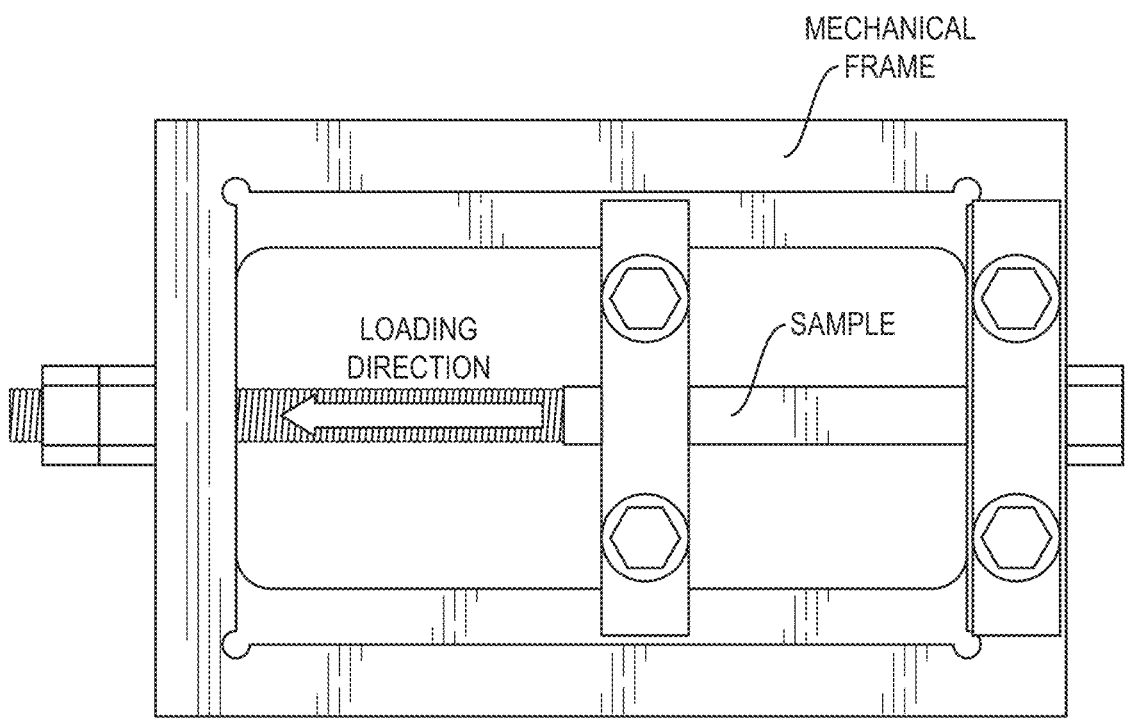
FIG. 10 shows a mechanical frame for stretching PEDOT/PSS/CNF aerogel sensors under SEM.

The ionic conductivity and pH values of aqueous CNF or PEDOT/PSS/CNF suspensions were measured using OAKTON pH/Con 510 series meter with ionic conductivity and pH probes, respectively. Scanning electron microscopy (SEM) of aerogels and PDMS infused aerogels placed on conductive carbon tape was performed using an XL30 SEM (FEI Company). PDMS infused aerogels were sliced into 28 mm×4 mm×1 mm dimension and mounted to a small mechanical frame with a gauge length of 20 mm (FIG. 10), on which the tensile loading was applied to the sample under SEM at 0% and 50% strain. Raman spectra were collected using an RM1000 Raman spectrometer (Renishaw plc) on aerogels using a 514.5 nm Argon ion laser. The aerogel with diameter about 3 mm were compressed into 90±20 μm thick sheets between two glass slides for Raman measurements.

Sheet resistances ($R_s$) of the casted films were measured via a four-probe device under a constant current of 45.3 μA supplied by Harrison 6205 dual DC power source. The voltage was measured with a multimeter. On each sample, $R_s$ was measured at 10 different locations and averaged value reported. Film thicknesses, t, was measured using a Dektak XT profilometer (Bruker Corporation). The electrical conductivity (σ) of the films was calculated as $σ=1/(tR_s)$.

Wide angle x-ray diffraction (WAXD) was performed on aerogel with diameter about 3 mm compressed into of 90±20 μm thick sheets between glass slides and scanned from 2 to 36° in a continuous mode using a PANalytical X-ray diffractometer (Malvern P analytical), with Cu Kα radiation (λ=1.54 Å) at 40 kV and 40 mA.

The mechanical behavior of CNF, PEDOT/PSS, and PEDOT/PSS/CNF aerogels were measured by a 5566 Instron universal testing machine at a constant 5% min$^{-1}$ strain rate. Cylindrical aerogel samples in 3 cm length, and either 3.8±0.2 mm or 3.0±0.3 mm diameters were coated with epoxy adhesive at each end to protect the aerogel from damage during clamping. The tensile strength, Young's modulus, and elongation were collected from at least 5 samples for each formulation, and their average and standard deviation reported.

TEMPO-mediated reaction oxidizes the C6 hydroxyls into carboxylic acid (COOH) that ionizes into C6 sodium carboxylates (COONa) on CNF surfaces at pH 10. Upon neutralization to pH 7 to end the reaction, approximately 86% sodium carboxylates remain, keeping the majority negatively charges to facilitate the subsequent mechanical defibrillation into highly aqueously dispersed individual CNFs. The aqueous CNF at 0.7 wt % has a pH value of 5.7, close to that of DI water in the air (5.5 pH due to the dissolution of $CO_2$) as well as the high ionic conductivity of 0.38 mS/cm that is consistent with the highly dissociated COO$^-$Na$^+$ ions.

Figure 8A:
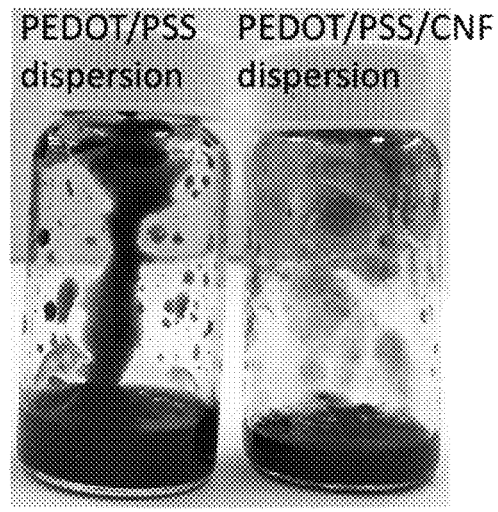
FIG. 8A-B shows PEDOT/PSS and PEDOT/PSS/CNF (1:1 PEDOT/PSS:CNF ratio).

In PEDOT/PSS, the PSS benzene rings carry both neutral $SO_3H$ and anionic $SO_3^-$ (FIG. 1A) with the latter ionically bonding with the cationic PEDOT thiophene rings into the PEDOT/PSS ionomer structure. The dominant PSS ionomer causes PEDOT/PSS complexes to be more anionic, providing electrostatic repulsion to repel each other as well as the negatively charged CNFs. Therefore, the negatively charged PSS serve as both dopant and dispersant for the cationic PEDOT particles. The dissociated $SO_3^-H^+$ in PSS also makes the PEDOT/PSS dispersion highly acidic with a pH of 1.9 at 0.7 wt %, thus highly effective in protonating the negatively charged sodium carboxylated on the CNF surfaces. Upon adding the dark blue aqueous PEDOT/PSS dispersion to the clear aqueous CNF at 1:1 w/w CNF:PEDOT/PSS and mixing for 30 min, the CNF-PEDOT/PSS mixture turned lighter blue (FIGS. 1B & 8A). The ionic conductivity increased from 0.38 mS/cm of the aq. CNF to 1.07 mS/cm of the 1:1 w/w CNF:PEDOT/PSS mixture, while pH value reduced from 5.7 to 2.7. Aqueous CNF, PEDOT/PSS and the well-mixed PEDOT/PSS/CNF dispersions, all at 0.7 wt %, were frozen at −20° C. for 15 h then slowly freeze-dried (−50° C., 0.05 mbar, 4 days) to produce aerogels. Cylinder shaped (2 cm diameter, 4 cm length) CNF and PEDOT/PSS/CNF aerogels weighed 14.6 and 14.1 mg or calculated densities of 11.6 and 11.2 mg cm$^{-3}$, respectively.). California poppy can support them without deforming their structures. Aerogels with different diameters (20.0±2 mm, 3.0±0.3 mm, 2.1±0.2 mm) could be fabricated simply by using different sizes of containers (FIG. 1C).

Figures 7A, 7B:
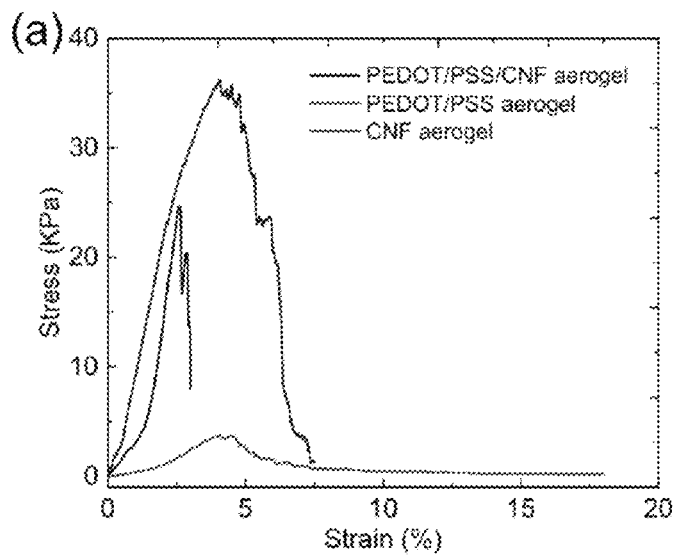
FIG. 7A-B shows tensile behavior of of CNF, PEDOT/PSS and PEDOT/PSS/CNF50 aerogels.

While CNF aerogel same retains the volume as the original aqueous suspension, both PEDOT/PSS aerogels with or without CNF decreased in volumes with more noticeable shrinkage of PEDOT/PSS/CNF aerogel than PEDOT/PSS aerogel (FIG. 7A). This more pronounced volume reduction of PEDOT/PSS/CNF aerogel is ascribed to protonation of CNF by PEDOT/PSS and their closer association, reinforcing the PEDOT/PSS network. Indeed, the 2.4±0.7 kPa tensile strength and 32.8±5.3 kPa Young's modulus of PEDOT/PSS aerogel was increased by ca. one order of magnitude to 25.0±4.1 kPa and 282.3±78.5 kPa, respectively, for PEDOT/PSS/CNF aerogel (FIG. 7B). The tensile strength and Young's modulus of the conductive aerogel are not on par with the CNF aerogel's respective 36.2±5.3 kPa and 510.4±95.3 kPa, as expected from reduced self-assembling of CNFs as a result of their protonation with PEDOT/PSS. Thus, the enhancement in the strength and Young's modulus of the PEDOT/PSS aerogel by CNF is mainly ascribed to the reinforcing effect of CNFs, but the breaking strain of PEDOT/PSS/CNF aerogel was reduced to 3.5% from 18% of PEDOT/PSS, also consistent with the reinforcement.

Figure 2A:
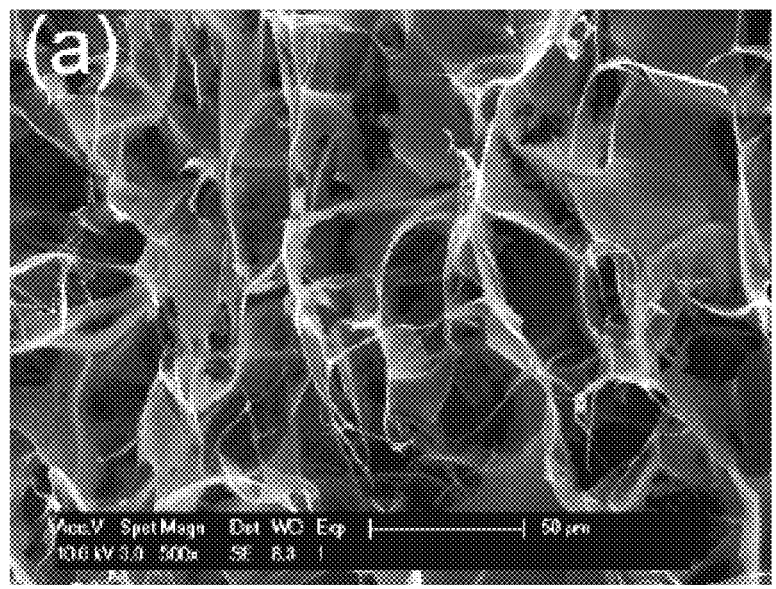
FIG. 2A-H shows microstructure of PEDOT/PSS and PEDOT/PSS/CNF aerogels.
Figure 2B:
Figure 2C:
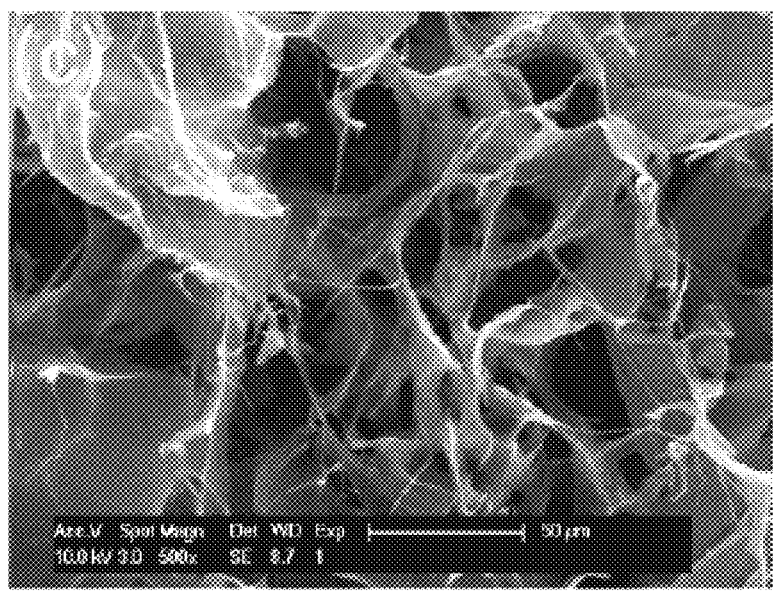
Figure 2D:
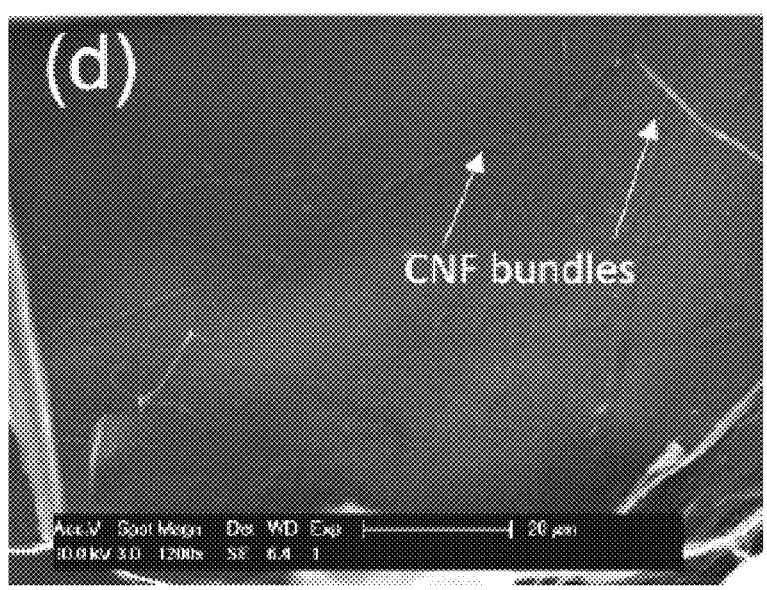

Both PEDOT/PSS and PEDOT/PSS/CNF aerogels are highly porous, containing pores in widely varied sizes of one to tens of micrometers (FIGS. 2A & 2C). The thin cellular walls of PEDOT/PSS aerogels appeared smooth, while those of PEDOT/PSS/CNF contained some micrometer wide fibrils (FIGS. 2B & 2D), indicating CNFs self-assembled into thicker bundles and embedded in PEDOT/PSS thin walls. While PEDOT/PSS aerogel disassembled and dispersed in water into a blue slurry within 5 min, PEDOT/PSS/CNF aerogel remain intact in water for several days, showing excellent wet resiliency (FIG. 8A-B), similar to CNF aerogels reported previously. This observation shows that, in the presence of PEDOT/PSS, CNFs self-assembled into coherent fibrous network that behave similarly to those pristine CNF aerogels. PEDOT/PSS/CNF aerogel is also similarly hydrophilic as CNF aerogel, absorbing 76 times of distilled water as compared with the 83 times of the CNF aerogel. Therefore, even in the presence of the dominant anionic PSS, self-assembling of CNFs may be aided by their protonation with PEDOT/PSS and lowered repulsion among CNFs. While wet resilient, PEDOT/PSS/CNF aerogel lost 8.5% mass when immersed in water for 10 minutes. The increased ionic conductivity of the surrounding water from 2.35 to 9.82 µS/cm supports the leaching of unbonded PSS that changed PEDOT:PSS:CNF weight ratio from the original 1:2.5:3.5 to 1:1.9:3.5, losing approximately one-quarter of PSS. The remaining hygroscopic PSS is thought to be either tightly associated with PEDOT or strongly hydrogen bonded with CNFs through the neutral $SO_3H$, thus insoluble.

Figures 2E, 2F:
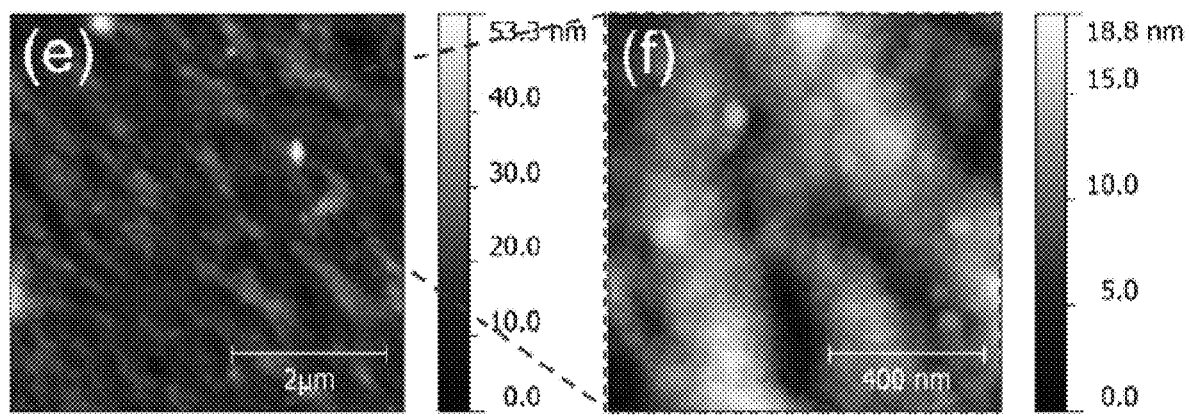
Figures 2G, 2H:
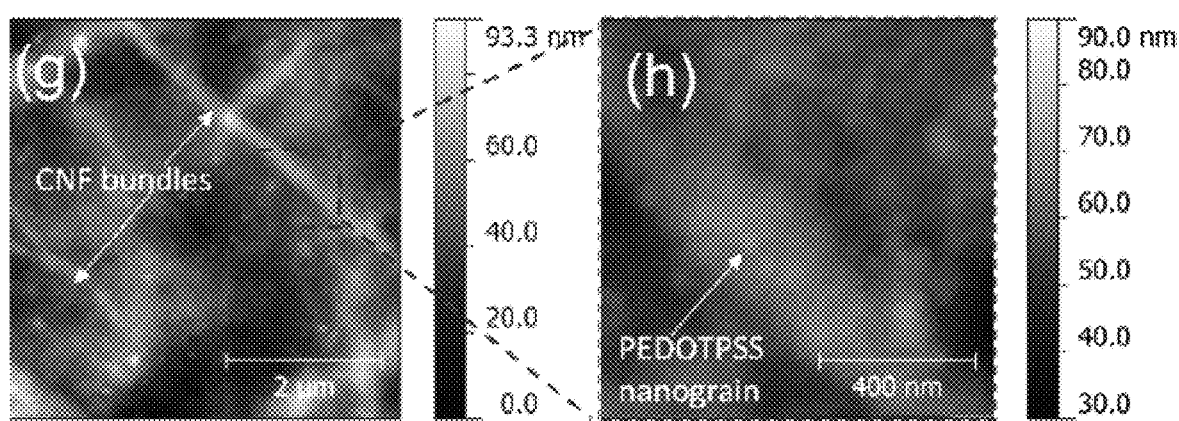

The association between CNF and PEDOT/PSS and their morphology was further elucidated by AFM evaluation of films cast with and without CNF (FIG. 2E-H). PEDOT/PSS thin film appeared relatively smooth with a root-mean-square (rms) roughness of 4.74 nm whereas that containing CNF showed self-assembled CNF bundles in several hundred nm widths embedded in PEDOT/PSS matrix (FIGS. 2E & 2G), resulting in increased rms roughness of 12.52 nm. Closer examination of PEDOT/PSS film showed connecting nanograins with an averaged width of 75.1±14.3 nm (FIG. 2F). These nanograins are consistent with the previous report of thin layer PSS coated and bonded PEDOT nanocrystals. The higher magnification image of PEDOT/PSS/CNF film (FIG. 2H) showed further detail of 48.5±5.7 nm wide PEDOT/PSS nanograins covering CNF bundles, clear evidence of strong CNF-PEDOT/PSS interaction among the coexisting PEDOT nanocrystals and self-assembled CNF bundles. The more segregated nanograins in PEDOT/PSS/CNF film is similar to EG doping effect to PEDOT/PSS films or fibers, consistent with the reduced electrostatic interactions between PEDOT and PSS in the presence of CNFs.

Figure 3A:
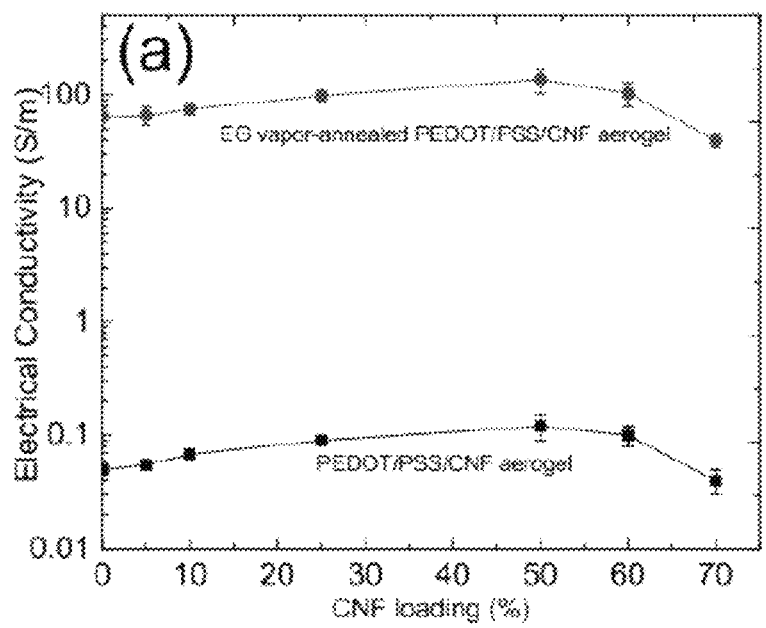
FIG. 3A-F shows characteristics of conductive PEDOT/PSS/CNF aerogels.
Figure 3B:
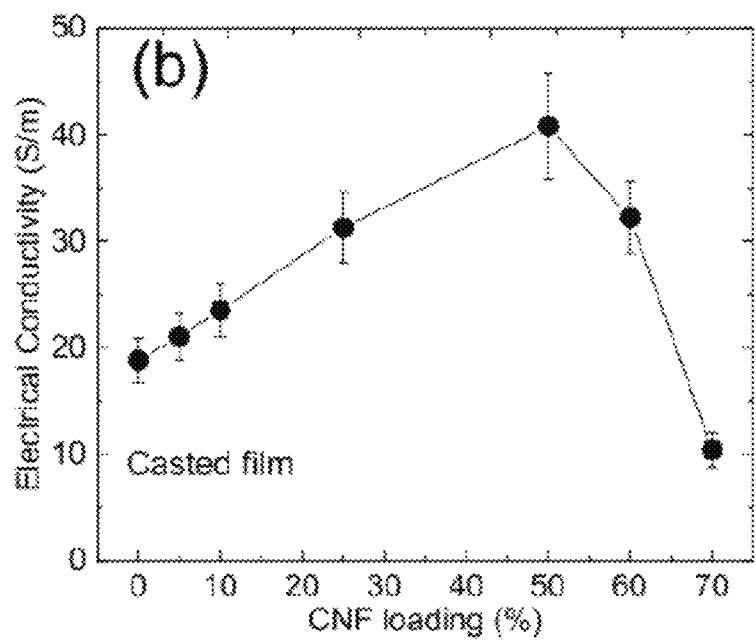
Figure 8B:
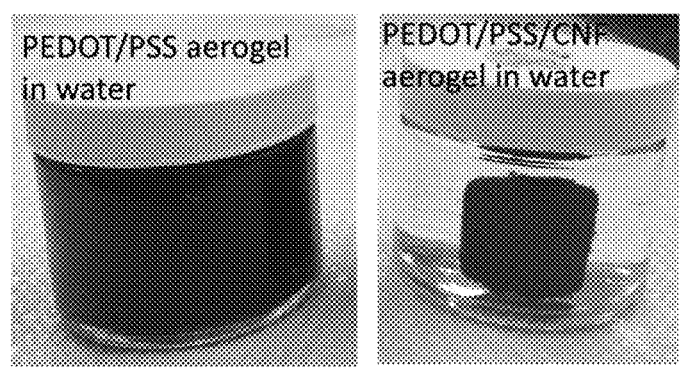

The electrical conductivity of PEDOT/PSS aerogel is low at 0.05 S $m^{-1}$, overly under-predicted based on their chemical compositions due to the highly porous aerogel structure, and increased with CNF loadings to reach 0.12 S $m^{-1}$ with 50 wt % CNF. The increased conductivity indicates microstructure change in PEDOT/PSS likely induced by the nonconductive CNF and will be explained in later sections. To further investigate the effect of CNF loading to PEDOT/PSS, the conductivity of films cast in the same compositions as the aerogels was measured to show similar levels of increase from 18.8±2.1 to 40.8±5.0 S $m^{-1}$ at 0 to 50 wt % CNF loadings, i.e., more than doubling. The conductivities of both aerogels and casted films, however, decreased with higher CNF loadings of 60 and 70 wt %, suggesting that protonating the excessive, nonconductive CNF with PSS may interfere the electrostatic interaction of PEDOT and PSS and the conductive pathway in either composites. Annealing the highly porous aerogels in EG vapor (150° C., 30 min) further reduced the resistance of PEDOT/PSS/CNF50 aerogel to 29.7±4.0 Ωcm$^{-1}$ (from 9.1±1.3 kΩ cm$^{-1}$ for the unannealed), corresponding to increased conductivity from 0.12±0.03 to 136±33 S $m^{-1}$, a 1,133 times increase (FIGS. 3A & 8A-B). It should be noted that annealing by immersing in EG bath was not feasible as the aerogel collapses upon removing excess EG by heating at 150° C. Thus, EG vapor annealing was proven to be not only far more effective but also more desirable in that only minute quantity was applied and no extra cleaning was necessary, thus a greener process than liquid EG immersion.

Figure 3C:
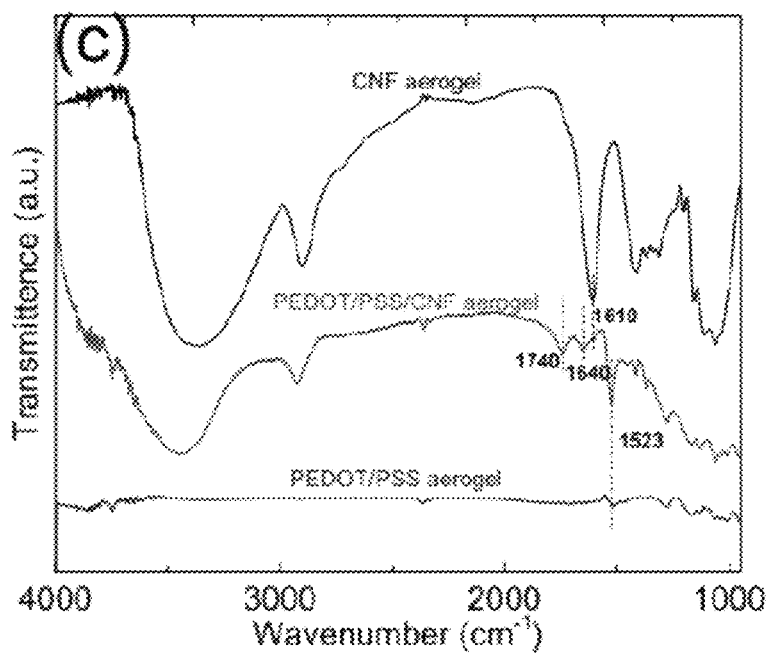

The interaction between CNF and PEDOT/PSS was further delineated by FTIR spectroscopy (FIG. 3C), specifically the carbonyl stretching in COOH (1740 cm$^{-1}$) and COO$^-$Na$^+$ (1610 cm$^{-1}$). CNF showed a sharp peak at 1610 cm$^{-1}$, indicative of the dominant COO$^-$Na$^+$ that is responsible for the high conductivity and acidic pH aforementioned. The PEDOT/PSS/CNF aerogel exhibited a new peak at 1740 cm$^{-1}$ while the one at 1610 cm$^{-1}$ almost completely diminished, indicative significant COO$^-$ Na$^+$ to COOH conversion and confirming protonation of CNFs. The apparent broadening of CNF hydroxyl band in PEDOT/PSS/CNF aerogel as compared to pure CNF aerogel indicates increased hydrogen bonding interactions between CNF surface carboxyl and PSS. Most significantly, the 1523 cm$^{-1}$ peak identified as the ring stretching of C=C bonds in the quinoid structure of thiophene backbone of PEDOT sharpened and significantly intensified in PEDOT/PSS/CNF aerogel. The planar quinoid structure presents the preferred conjugated backbone (FIG. 3D) that explains for the higher conductivity of PEDOT/PSS/CNF aerogels. The absorbed water in PEDOT/PSS/CNF aerogel was shown by the appearance of OH deformation peak at 1640 cm$^{-1}$ and the shifting of CNF hydroxyl peak at 3380 cm$^{-1}$ to 3442 cm$^{-1}$.

Figure 3D:
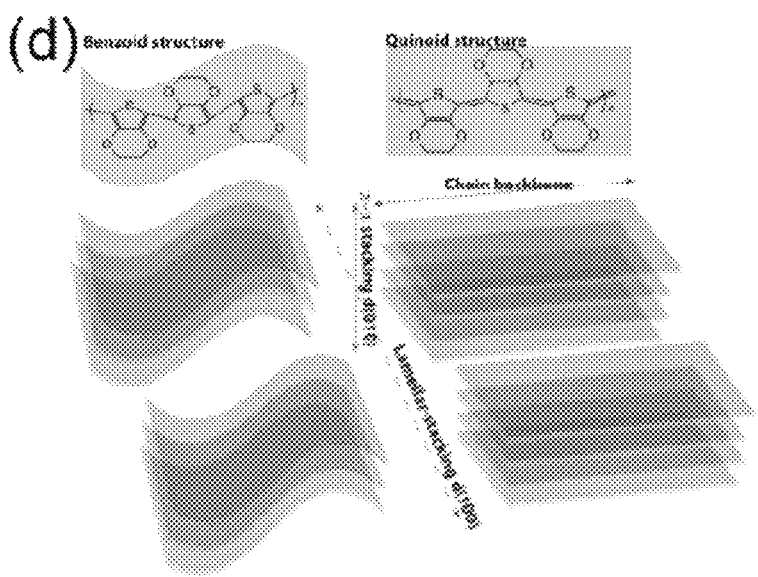
Figure 3E:
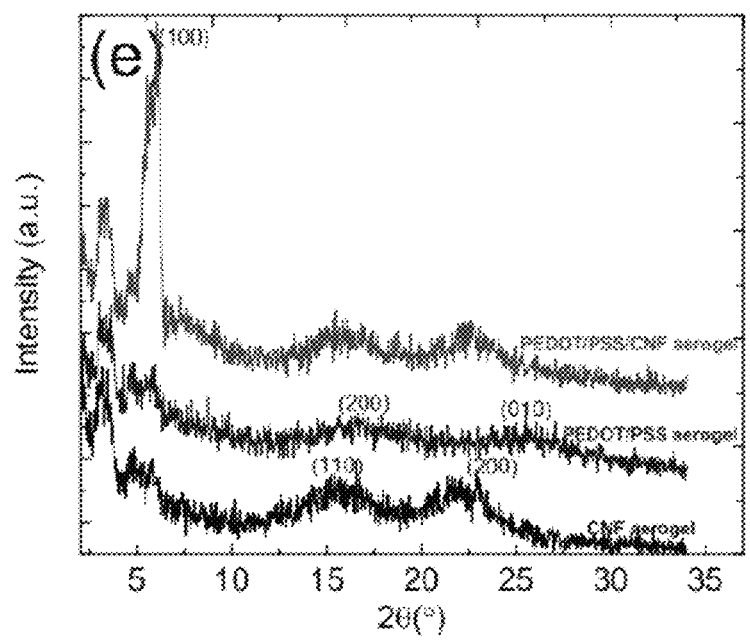

The planar PEDOT quinoid structure in PEDOT/PSS/CNF50 aerogel was further verified by XRD (FIG. 3E). CNF aerogel exhibited the typical peaks at 16.8° and 22.7°, corresponds to monoclinic d(110), and d(200) crystallographic lattice planes of cellulose Iβ, respectively, as reported on rice straw-derived TEMPO-CNF. PEDOT/PSS aerogel presented two characteristic peaks at 6.1°, and 25.9°, corresponding to the lamella stacking distance, d(100), of alternating PEDOT and PSS in the plane and the interchain planar π-π stacking distance d(010) of PEDOT, respectively. Another peak at 17.3° is indicative of the amorphous halo of PSS chains. PEDOT/PSS/CNF aerogel showed a significantly intensified 6.1° peak, confirming the interaction with CNFs strongly enhanced planar PEDOT-PSS lamella stacking which promotes self-organization of the PEDOT chains consistent with planarization of thiophene into the planar quinoid structure. (FIG. 3D).

Figure 3F:
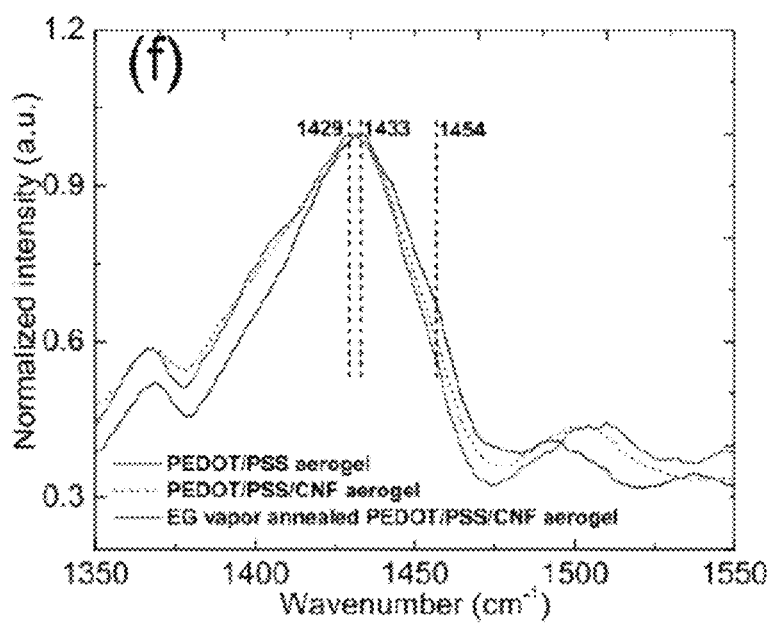

To further explain the significantly improved electrical properties from protonation and EG vapor annealing, the conjugated PEDOT molecular structure was analyzed by Raman microscopy. The pristine PEDOT/PSS aerogel had a sharp peak at 1433 cm$^{-1}$ (FIG. 3F), assigned to the symmetric $X_\alpha=X_\beta$ stretching deformation in the PEDOT aromatic thiophene ring. The shoulder peak at 1454 cm$^{-1}$ was assigned to the breathing of benzoid structure of the thiophene ring, representing a coil conformation structure associated with a low conductive state. This benzoid band reduced when CNF loading, consistent with the benzoid-to-quinoid structural transformation. Such preferred linear or expanded-coil conformation facilitates electron transfer. This transformation agrees with the FTIR and XRD results (FIGS. 3C & 3E), providing structural evidence on the effect of CNFs on changing the PEDOT structure from a low conductive state to a high conductive state. The benzoid-associated peak at 1454 cm$^{-1}$ further reduced after EG vapor annealing. Moreover, the position of the symmetric $C_\alpha=C_\beta$ peak is 4 cm$^{-1}$ lower than the 1433 cm$^{-1}$ for the pristine PEDOT/PSS and PEDOT/PSS/CNF aerogels, consistent with the dominant thiophene quinoid structure over benzoid or planarization of the thiophene rings on PEDOT from EG vapor-annealing (FIG. 3D). EG vapor annealing was advantageous and significant to not only dramatically improve the conductivity of the aerogel by two orders of magnitude but also preserved the integrity of the aerogel.

Example 3: Strain Sensing Using Conductive Nanocellulose Aerogels

Encapsulation of Conductive Aerogels for Strain Sensors.

The PDMS precursor (4.3 g, the weight ratio of base to curing agent was 10:1) was pouring into a 10 cm diameter Petri dish and cured at 70° C. for 12 min to form a 0.4 mm-thick base layer. Then, either PEDOT/PSS or PEDOT/PSS/CNF aerogel was placed on top of the PDMS base layer with two ends connected to copper wires and painted with silver epoxy and covered with PDMS precursor (20 g) as the top layer for 2 h at room temperature, then cured at 70° C. for 2 h. The effective length of the aerogels between the silver paste was about 4±0.2 cm.

Figure 9B:
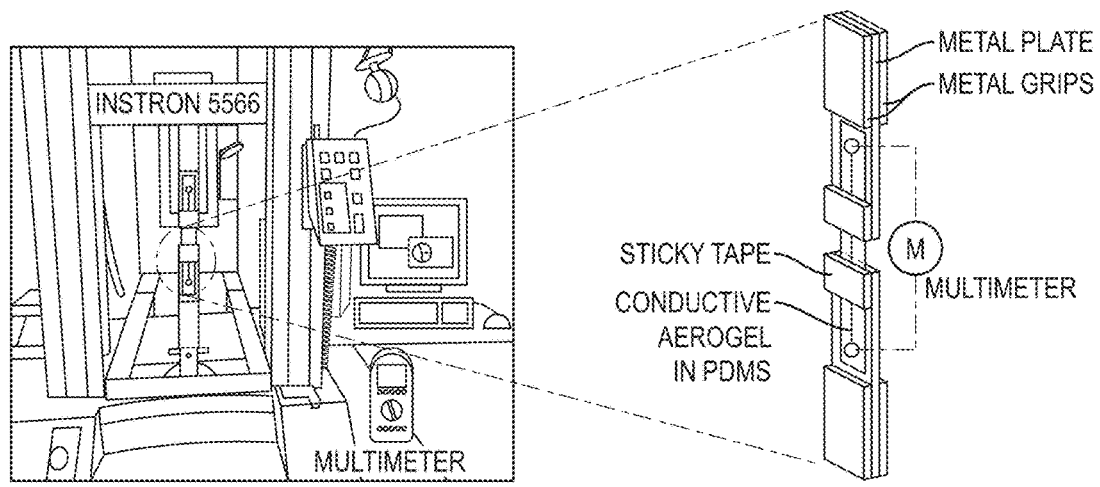

The setup for electromechanical testing of the specimen is shown in FIG. 9B. The loading/unloading of the sample is controlled by a 5566 Instron machine. The dog-bone shaped specimen was glued to two metal plates that were clamped by the Instron machine. The distance between the metal plates was 8 mm which was the effective sample length. The change in electrical resistance was monitored by a U1252B digital multimeter. The incremental, cyclic stretching and relaxing program were applied to initiate the fragmentation of the sample. The program was set to an incremental strain of 25%, starting at 0% and continuing until 100%, at a speed of 2.4 mm min$^{-1}$. Then, the incremental cyclic test was repeated once, and a cyclic stretching/relaxing program was applied to the sample with maximum strains of 50% at each cycle. The resistance data were recorded every 1 s during the test. Stretching/relaxing of the sensor was captured by a video camera. The gauge factor (GF) of the strain sensors was defined as GF=($\Delta R/R_0$)/$\varepsilon$, where $R_0$ is the initial resistance, $\Delta R/R_0$ is the relative change in resistance, and $\varepsilon$ is the applied strain.

Figure 4A:
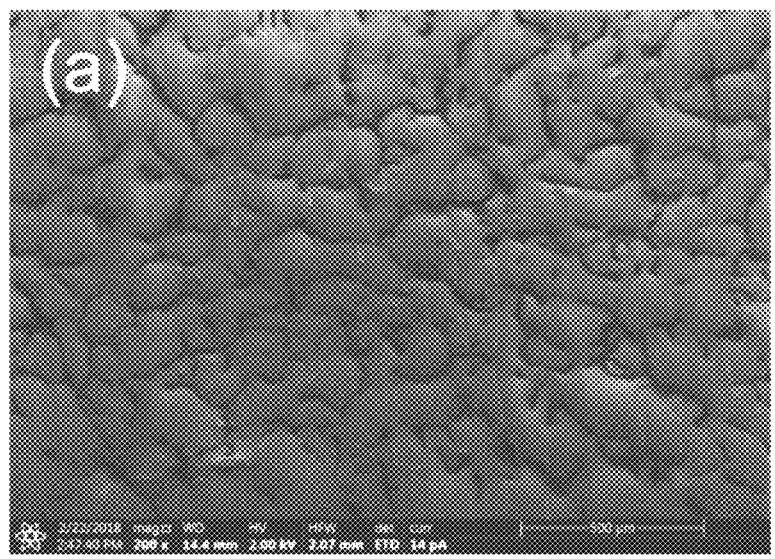
FIG. 4A-B shows cross-sectional images of PDMS infused conductive aerogels.
Figure 4B:
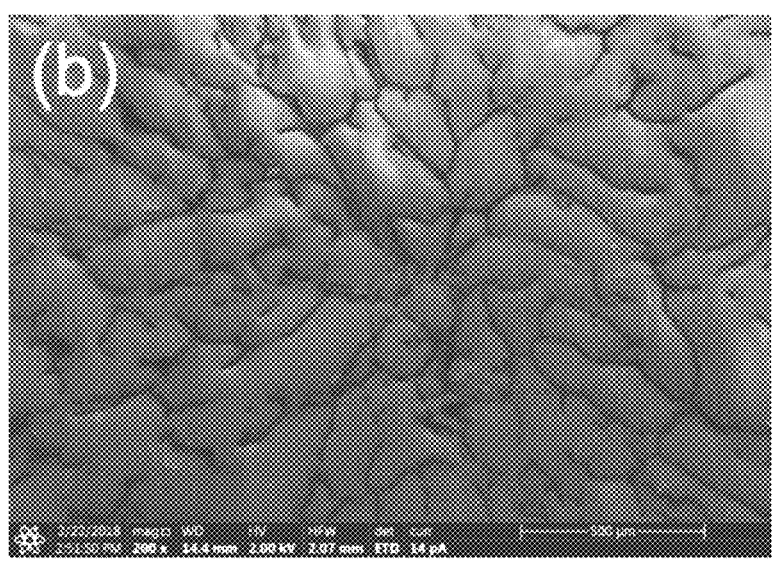

The highly porous structure of PEDOT/PSS/CNF aerogels were infused with PDMS (FIG. 9A). The PDMS precursor infused PEDOT/PSS/CNF50 and PEDOT/PSS/CNF70 aerogels (4 cm long) showed only slightly increased resistance from 98 to 108Ω and 4.1 to 4.3 kΩ, respectively, then further increased to 208Ω and 15 kΩ, respectively, from curing that ascribing mainly to the release of residue stress in PDMS. The scanning electron microscopy (SEM) of cross-sections of PEDOT/PSS-PDMS or PEDOT/PSS/CNF-PDMS composite materials showed completely PDMS infused aerogels (FIG. 4A-B).

Figure 5A:
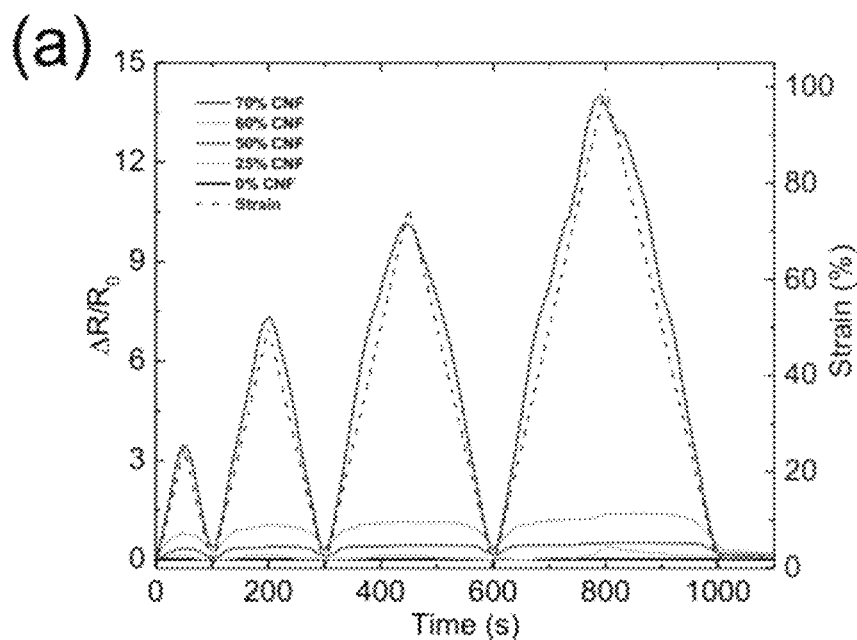
FIG. 5A-D shows strain sensing of PDMS-infused PEDOT/PSS/CNF conducting aerogels as determined by relative electrical resistance change $\Delta R/R_0$.
Figure 5B:
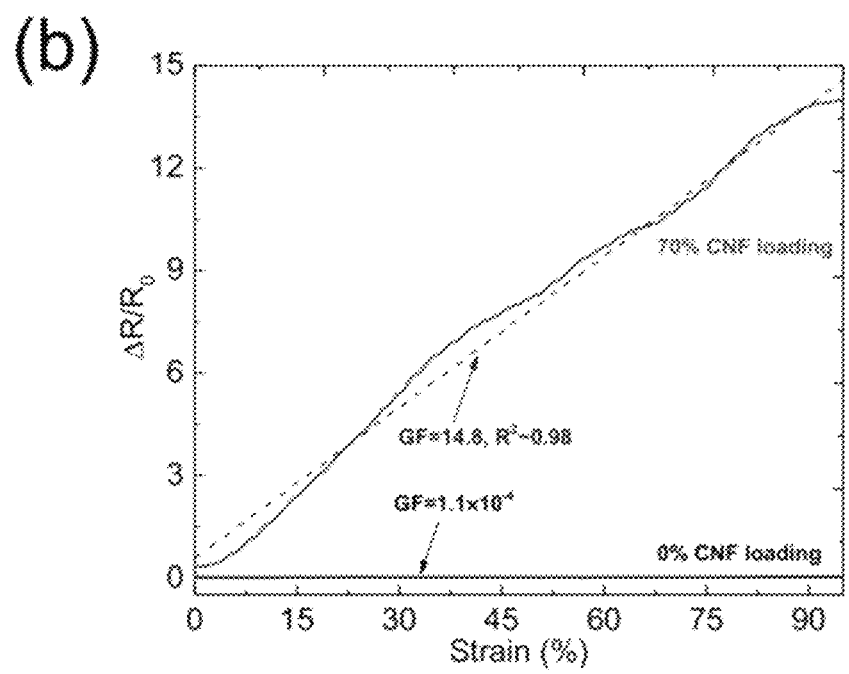
Figure 5C:
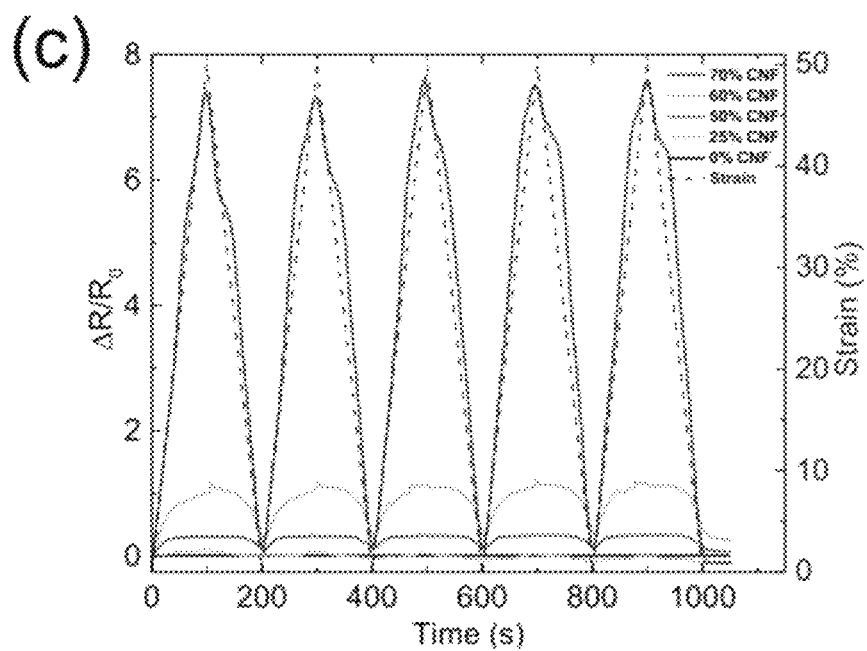

The relative change in electrical resistance, $\Delta R/R_0$, of the PDMS-infused conductive PEDOT/PSS aerogel was minimum from 0% to 100% strain, reaching a maximum 0.019 at 100% (FIG. 5A). The little change in resistance indicates that the conductive pathway of PEDOT/PSS network was not altered by the elastic PDMS-filling. In contrast, CNF loadings at 50 wt % and 60 wt % caused noticeable changes to the resistance in these PDMS-infused PEDOT/PSS/CNF conducting aerogels. Over incrementally increased strains, $\Delta R/R_0$, first increased at low strain (<20%), attributed to the disconnecting of the conductive networks in PEDOT/PSS/CNF aerogel, then plateaued from 20% to 100% strain range. PEDOT/PSS/CNF aerogels are not as elastic as PEDOT/PSS aerogels (FIG. 7A, stress-strain curve), forming cracks to disconnect the conductive network with increasing strain at up to 20% strain. The resistance then plateaued or became insensitive to strain from 20% to 100%, suggesting maximum cracks density may have reached at around 20% strain. The conductive pathway becomes elastic from 20% to 100% strain. The different response of the aerogel to mechanical strain levels may offer different sensing mechanism for these PDMS-infused strain sensors.

At 70 wt % CNF loading, no $\Delta R/R_0$ plateaus were observed as seen at lower CNF loadings. In contrary, the $\Delta R/R_0$ dramatically increased to 14.7 at 100% strain and the trend of $\Delta R/R_0$ vs strain was completely reversible following each incremental step of increasingly applied strains. The relative changes in resistance ($\Delta R/R_0$) for PDMS-infused PEDOT/PSS and PEDOT/PSS/CNF70 aerogels were plotted over strain levels to show high linearity of 0.98 from 0% to 95% strain and a very high gauge factor (GF)=14.8 at 95% strain. The GF value is five orders of magnitude higher than the 1.1×10$^{-4}$ GF of the insensitive PDMS-infused PEDOT/PSS aerogel. The value is also over 7 times higher than conventional metal gauges, typically with GF around 2.0 at low strain ($\varepsilon$<5%). Nonlinearity is one of the main drawbacks of most of the piezo-resistive type strain sensors. Typical strain sensors based on conductive nanomaterials, e.g., metal nanoparticles, CNT networks, as the sensing components exhibit either nonlinear or two linear regions. The single and extended linear region of PDMS-infused PEDOT/PSS/CNF70 sensor simplifies the calibration process and ensures accurate measurements through the whole range of applied strains. While PDMS-infused PEDOT/PSS aerogels can be used as resistance-insensitive materials at large strains, PDMS-infused PEDOT/PSS/CNF aerogels can be applied as highly stretchable, strain-sensitive sensors.

Figure 5D:
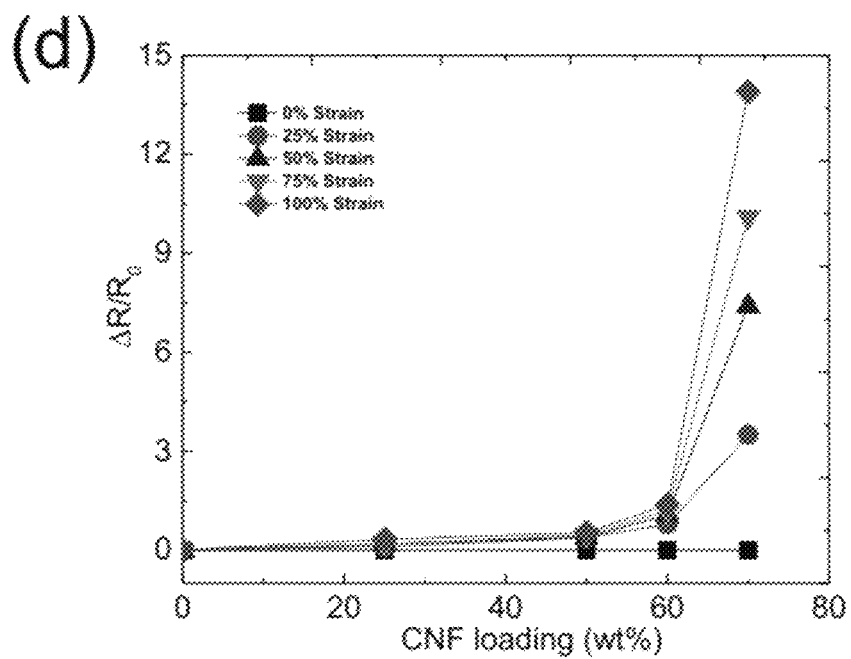

Dynamic $\Delta R/R_0$ responses PDMS-infused PEDOT/PSS/CNF aerogels over five cycles of a strain from 0 to 50% also showed to be highly reversible and stable at all CNF loadings, with very little hysteresis. For the sensor loaded with 70 wt % CNF, the $\Delta R/R_0$ follow the evolution of the applied strain closely. This $\Delta R/R_0$ vs. strain relationship shows the sensing behaviors PEDOT/PSS/CNF aerogels are tunable by changing the CNF loading and are sensitive to detect the subtle strain change with a wide strain detection range. FIG. 5D further confirmed the impact of CNF loading to the $\Delta P/P_0$, proving the nonconductive CNF could replace a significant portion (up to 70 wt %) of PEDOT/PSS in the aerogel while dramatically improving the sensitivity of the strain sensor.

Figure 6A:
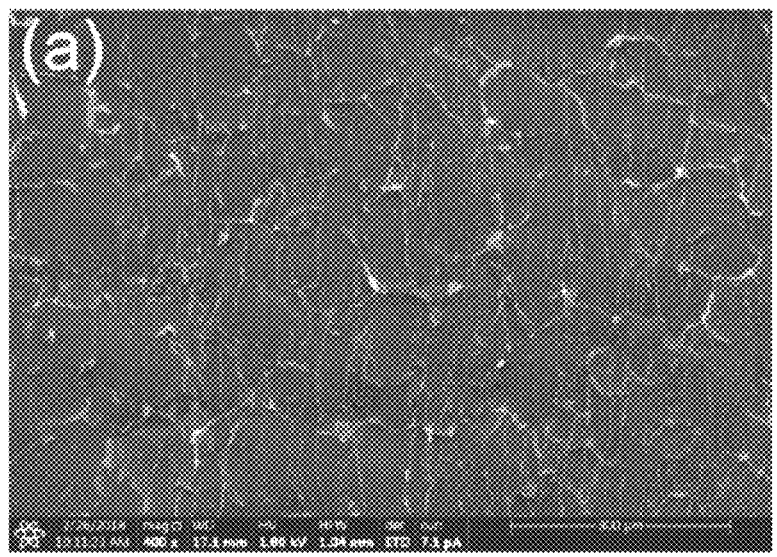
FIG. 6A-E shows microstructure change of conductive aerogel composites under tensile strains.
Figure 6B:
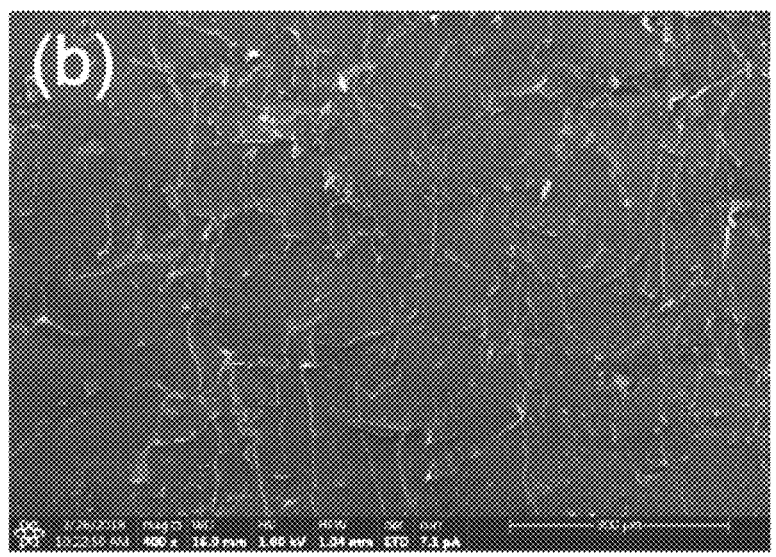
Figure 6C:
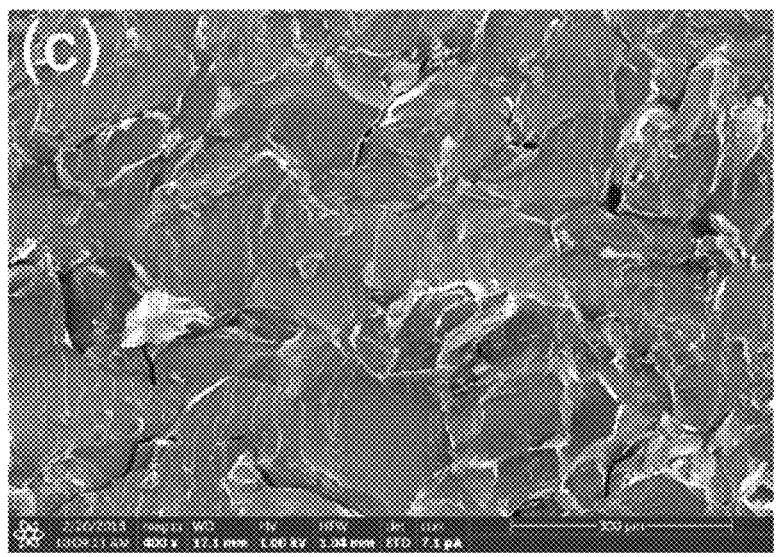
Figure 6D:
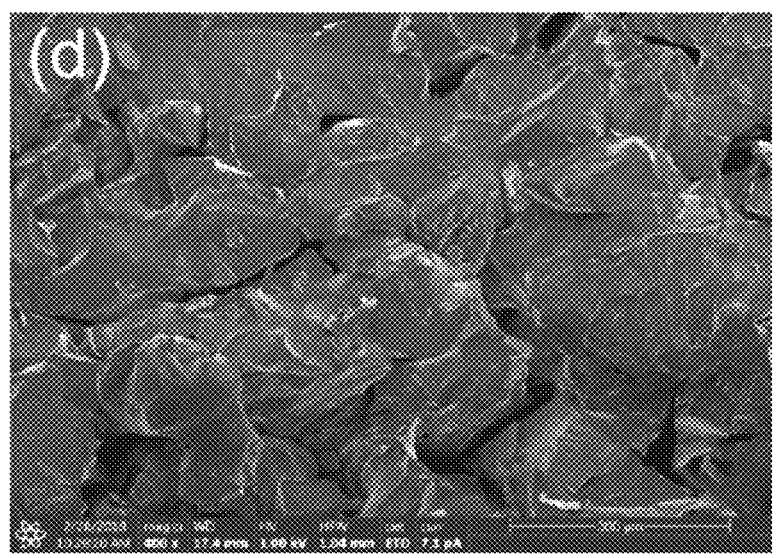
Figure 6E:
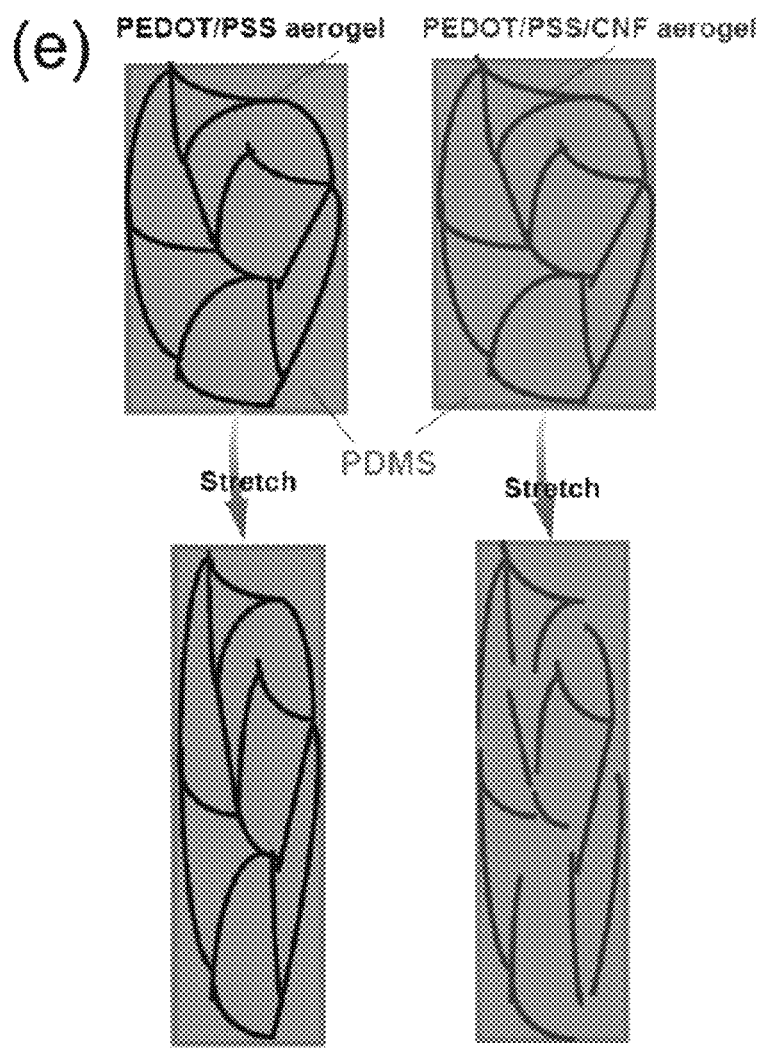

To explore the strain-sensing mechanism, both PDMS infused aerogels were sliced to expose the aerogel network and mounted to a small mechanical frame (FIG. 10), on which tensile strain can be applied under SEM. PDMS-infused PEDOT/PSS aerogel showed no obvious microstructure changes when stretched from 0 to 50% strain, which is ascribed to the elastic nature of the PEDOT/PSS aerogel (FIG. 6A-B). Although the network of PEDOT/PSS aerogel deforms and elongates in the tensile direction, the conductive pathway maintained with the help of elastic PDMS around (FIG. 6E). In contrast, PDMS-infused PEDOT/PSS/CNF70 aerogel network exhibited noticeable detachment between PDMS and the aerogel with an average opening distance of 23.6±8.5 μm, under tensile strain. This PDMS-infused PEDOT/PSS/CNF70 aerogel had a nine-fold increases in Young's modulus than PEDOT/PSS aerogel, ascribing mainly to the increased stiffness from the significant CNF incorporated. CNF loadings help to resist the strain to a large extent by forming cracks and high CNF loadings hinder the conductive pathway especially at high strain.

In PDMS-infused PEDOT/PSS/CNF aerogels, CNF plays several roles and has many merits. First, CNF strengthens and increase the stiffness to improve the integrity of such aerogels to be handled. CNF also transforms the resistance insensitive PEDOT/PSS aerogels into a highly strain sensitive PEDOT/PSS/CNF sensors to exhibit high linearity in relative electrical resistance change $\Delta R/R_0$ in comparison to other piezoresistive strain sensors. Economically, high CNF loading replaces a significant portion of the costly PEDOT/PSS to reduce overall cost. To our best knowledge, this is the first report on conductive nanocellulose aerogel strain sensors that are highly stretchable (up to 100% strain) and highly sensitive (GF=14.8) with high linearity. Furthermore, this represents novel use biomass-derived nanoconductive CNFs as the building blocks in creating light, strong, stretchable and conductive strain sensors.

Rice straw-derived TEMPO-CNF has shown to be effectively protonated and hydrogen bonded with a conductive PEDOT/PSS polymer complex to generate very strong and conductive PEDOT/PSS/CNF aerogels. This approach has several merits. Most significantly, the dual interactions between CNF surface carboxylate/carboxyl groups with PSS in the PEDOT/PSS complex transformed the PEDOT benzoid into the more favorable electron conductive planar quinoid structure. As the nonconductive CNF loadings increased from 0 to 50 wt %, the conductivity of the aerogel was in fact increased from 0.05 to 0.12 S m$^{-1}$. The protonation of CNF surface carboxylates into carboxyls that hydrogen bond with PSS significantly improved the tensile stress and Young's modulus of the PEDOT/PSS/CNF aerogels. When infused with PDMS elastomer, CNF has transformed a resistance-insensitive PDMS-infused PEDOT/PSS aerogel into strain sensors with high sensitivity and high linearity. The approach to protonate CNF surface carboxylates with PSS in the conductive PEDOT-PSS and their hydrogen bonding with carboxyls is robust, producing not only ultra-light and strong, water-insoluble conductive aerogels but, when infused with an elastomer, also highly sensitive, stretchable and linearly responsive strain sensors with tunable sensitivity.

Although the foregoing invention has been described in some detail by way of illustration and example for purposes of clarity of understanding, one of skill in the art will appreciate that certain changes and modifications may be practiced within the scope of the appended claims. In addition, each reference provided herein is incorporated by reference in its entirety to the same extent as if each reference was individually incorporated by reference. Where a conflict exists between the instant application and a reference provided herein, the instant application shall dominate.

What is claimed is:

1. An aerogel composition comprising:
   a conductive polymer; and
   cellulose nanofibrils (CNF), wherein the CNF is present in the composition at from 10% to 90% (w/w).

2. The composition of claim 1, wherein the conductive polymer is an acidic conductive polymer.

3. The composition of claim 1, wherein the conductive polymer comprises a mixture of poly(3,4-ethylene dioxythiophene) (PEDOT) and poly(styrene sulfonate) (PSS).

4. The composition of claim 3, wherein the mixture comprises a ratio of PEDOT to PSS of 1:1 to 1:10 (w/w).

5. The composition of claim 3, wherein the mixture comprises a ratio of PEDOT to PSS of about 1:2.5 (w/w).

6. The composition of claim 1, wherein the CNF is present in the composition at from 25% to 75% (w/w).

7. The composition of claim 1, wherein the conductive polymer comprises a mixture of poly(3,4-ethylene dioxythiophene) (PEDOT) and poly(styrene sulfonate) (PSS) in a ratio of about 1:2.5 (w/w), and the CNF is present in the composition at about 70% (w/w).

8. A sensor comprising:
   a first polymer substrate having a first surface;
   a conducting layer comprising an aerogel composition of claim 1, wherein the conducting layer is deposited on the first surface of the first polymer substrate and having a first end and a second end;
   a first electrode at the first end of the conductive layer;
   a second electrode at the second end of the conductive layer; and
   a second polymer substrate deposited on the conducting layer.

9. The sensor of claim 8, wherein the first polymer substrate and second polymer substrate is polydimethylsiloxane (PDMS).

\* \* \* \* \*